US012746478B2

(12) United States Patent
Liang et al.

(10) Patent No.: US 12,746,478 B2
(45) Date of Patent: Sep. 29, 2026

(54) RESOURCE PRELOADING METHOD AND APPARATUS, STORAGE MEDIUM, AND COMPUTER DEVICE

(71) Applicant: TENCENT TECHNOLOGY (SHENZHEN) COMPANY LIMITED, Shenzhen (CN)

(72) Inventors: Zhiming Liang, Shenzhen (CN); Jiang Bian, Shenzhen (CN); Jun Deng, Shenzhen (CN); Siming Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 570 days.

(21) Appl. No.: 18/357,678

(22) Filed: Jul. 24, 2023

(65) Prior Publication Data

US 2023/0364515 A1 Nov. 16, 2023

Related U.S. Application Data

(63) Continuation of application No. PCT/CN2022/129496, filed on Nov. 3, 2022.

(30) Foreign Application Priority Data

Jan. 12, 2022 (CN) ......................... 202210033926.5

(51) Int. Cl.
*A63F 13/77* (2014.01)
*A63F 13/533* (2014.01)
*G06F 9/445* (2018.01)

(52) U.S. Cl.
CPC ............ *A63F 13/77* (2014.09); *A63F 13/533* (2014.09); *G06F 9/44521* (2013.01)

(58) Field of Classification Search
CPC ..... A63F 13/77; A63F 13/533; G06F 9/44521
See application file for complete search history.

(56) References Cited

U.S. PATENT DOCUMENTS 9,015,832 B1 * 4/2015 Lachwani ............... G06F 21/52 726/22
10,735,270 B1 * 8/2020 Whipple ............ G06F 11/3006
(Continued)

FOREIGN PATENT DOCUMENTS

CN 106502670 A 3/2017
CN 106651747 A 5/2017
(Continued)

OTHER PUBLICATIONS

International Search Report for PCT/CN2022/129496, dated Jan. 6, 2023.
Written Opinion for PCT/CN2022/129496, dated Jan. 6, 2023.

*Primary Examiner* — Malina D. Blaise
(74) *Attorney, Agent, or Firm* — Sughrue Mion, PLLC

(57) ABSTRACT

A resource preloading method performed by at least one processor and including: loading a static resource set of a round of a game during a character selection stage of the round, the character selection stage selecting a virtual character participating in the round, and the static resource set comprising resources that are to be used in the round and that are not related to character configuration information determined during the character selection stage; and based on the loading of the static resource set being completed during the character selection stage, loading a dynamic resource set of the round during a resource loading stage of the round, the dynamic resource set comprising resources that are to be used in the round and that are related to the character configuration information.

20 Claims, 11 Drawing Sheets

(56) References Cited

U.S. PATENT DOCUMENTS

| | | | | |
|---|---|---|---|---|
| 11,130,062 | B2 * | 9/2021 | Yasuhara | A63F 13/822 |
| 12,097,429 | B2 * | 9/2024 | Ohashi | A63F 13/35 |
| 12,186,661 | B2 * | 1/2025 | Li | A63F 13/537 |
| 12,251,633 | B2 * | 3/2025 | Ueda | A63F 13/533 |
| 2009/0149248 | A1 * | 6/2009 | Busey | A63F 13/12<br>463/43 |
| 2010/0304806 | A1 * | 12/2010 | Coleman | A63F 13/69<br>463/2 |
| 2012/0154438 | A1 * | 6/2012 | Cohen | A63F 13/216<br>345/632 |
| 2014/0129343 | A1 * | 5/2014 | Finster | G06Q 30/0269<br>705/14.66 |
| 2014/0162785 | A1 * | 6/2014 | Reiche | A63F 13/235<br>463/36 |
| 2014/0213332 | A1 * | 7/2014 | Otsuka | A63F 13/30<br>463/2 |
| 2014/0327210 | A1 * | 11/2014 | Gerard | A63F 13/80<br>273/308 |
| 2015/0231499 | A1 * | 8/2015 | Mizukami | A63F 13/35<br>463/31 |
| 2015/0231500 | A1 * | 8/2015 | Aizono | A63F 13/422<br>463/31 |
| 2015/0238856 | A1 * | 8/2015 | Eika | A63F 13/70<br>463/31 |
| 2016/0023106 | A1 * | 1/2016 | Mizuno | A63F 13/35<br>463/42 |
| 2016/0124518 | A1 * | 5/2016 | Takahashi | G06F 3/04817<br>463/31 |
| 2016/0332074 | A1 * | 11/2016 | Marr | A63F 13/55 |
| 2016/0364178 | A1 * | 12/2016 | Izuno | A63F 13/95 |
| 2018/0071632 | A1 * | 3/2018 | Takahashi | A63F 13/55 |
| 2018/0214767 | A1 * | 8/2018 | Oh | G06T 13/20 |
| 2020/0276502 | A1 * | 9/2020 | Gustafsson | A63F 13/53 |
| 2022/0387891 | A1 * | 12/2022 | Suenaga | A63F 13/46 |
| 2024/0131435 | A1 * | 4/2024 | Hoshino | A63F 13/822 |

FOREIGN PATENT DOCUMENTS

| | | | |
|---|---|---|---|
| CN | 111897596 | A | 11/2020 |
| CN | 112612982 | A | 4/2021 |
| CN | 113018866 | A | 6/2021 |
| CN | 113158098 | A | 7/2021 |
| CN | 114428921 | A | 5/2022 |
| WO | 2020/251608 | A1 | 12/2020 |

* cited by examiner

RESOURCE PRELOADING METHOD AND APPARATUS, STORAGE MEDIUM, AND COMPUTER DEVICE

CROSS REFERENCE TO RELATED APPLICATION(S)

This application is a continuation application of International Application No. PCT/CN2022/129496 filed on Nov. 3, 2022, which claims priority to Chinese Patent Application No. 202210033926.5 filed with the China National Intellectual Property Administration on Jan. 12, 2022, the disclosures of which are incorporated by reference in their entireties.

FIELD

The disclosure relates to the field of Internet technologies, and in particular, to a resource preloading method and apparatus, a storage medium, and a computer device.

BACKGROUND

As the gaming industry continues to evolve, games are gaining increasing popularity among the public. A basic process of a game usually includes a preparation stage and a battle stage. For example: a multiplayer online battle arena (MOBA) running on a mobile phone at least includes processes of a character selection stage and a resource loading stage, prior to the battle stage. The resource loading stage is to load, the required resources according to the resources needed for the current round analyzed by the character selection stage. In some resources preloading methods, all resources required for the current round are usually loaded during the resource loading stage. However, as the complexity of a single round of a game gradually increases, the quantity of resources in the round also become larger, resulting in a technical problem of long resource loading time.

SUMMARY

Provided is a resource preloading method and apparatus, a storage medium, and a computer device.

According to some embodiments, a resource preloading method is performed by at least one processor and includes: loading a static resource set of a round of a game during a character selection stage of the round, the character selection stage selecting a virtual character participating in the round, and the static resource set comprising resources that are to be used in the round and that are not related to character configuration information determined during the character selection stage; and based on the loading of the static resource set being completed during the character selection stage, loading a dynamic resource set of the round during a resource loading stage of the round, the dynamic resource set comprising resources that are to be used in the round and that are related to the character configuration information/

According to some embodiments, a resource preloading apparatus includes at least one memory configured to store program code; and at least one processor configured to read the program code and operate as instructed by the program code, the program code including: first loading code configured to cause the at least one processor to load a static resource set of a round during a character selection stage of the round, the character selection stage selecting a virtual character participating in the round, and the static resource set comprising resources that are to be used in the round and are not related to character configuration information determined during the character selection stage; and second loading code configured to cause the at least one processor to, based on the loading of the static resource set being completed during the character selection stage, load a dynamic resource set of the round during a resource loading stage of the round, the dynamic resource set comprising resources that are to be used in the round and that are related to the character configuration information.

According to some embodiments, a non-transitory computer-readable storage medium stores instructions, the instructions including: one or more instructions which, when executed by at least one processor of a resource preloading device, cause the at least one processor to: load a static resource set of a round of a game during a character selection stage of the round, the character selection stage selecting a virtual character participating in the round, and the static resource set comprising resources that are to be used in the round and that are not related to character configuration information determined during the character selection stage; and based on the loading of the static resource set being completed during the character selection stage, load a dynamic resource set of the round during a resource loading stage of the round, the dynamic resource set comprising resources that are to be used in the round and that are related to the character configuration information.

Details of some embodiments are provided in the drawings and descriptions below. Other features, objectives, and advantages of this application will become apparent from the specification, the drawings, and the claims.

BRIEF DESCRIPTION OF THE DRAWINGS

To describe the technical solutions of some embodiments more clearly, the accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

The terms “first”, “second”, and other terms in this specification, claims, and the drawings in some embodiments are used for distinguishing similar objects instead of describing a specific order or sequence. Data used in such a way may be exchanged under appropriate conditions, so that some embodiments described here can be implemented in a sequence other than sequences graphically shown or described here. In addition, the terms “include”, “have”, and any other variant thereof refer to a non-exclusive inclusion. For example, a process, method, system, product, or device that includes a list of operations or units is not necessarily limited to those operations or units that are expressly listed, but may include other operations or units that are not expressly listed or are inherent to the process, method, system, product, or device.

Figure 1:
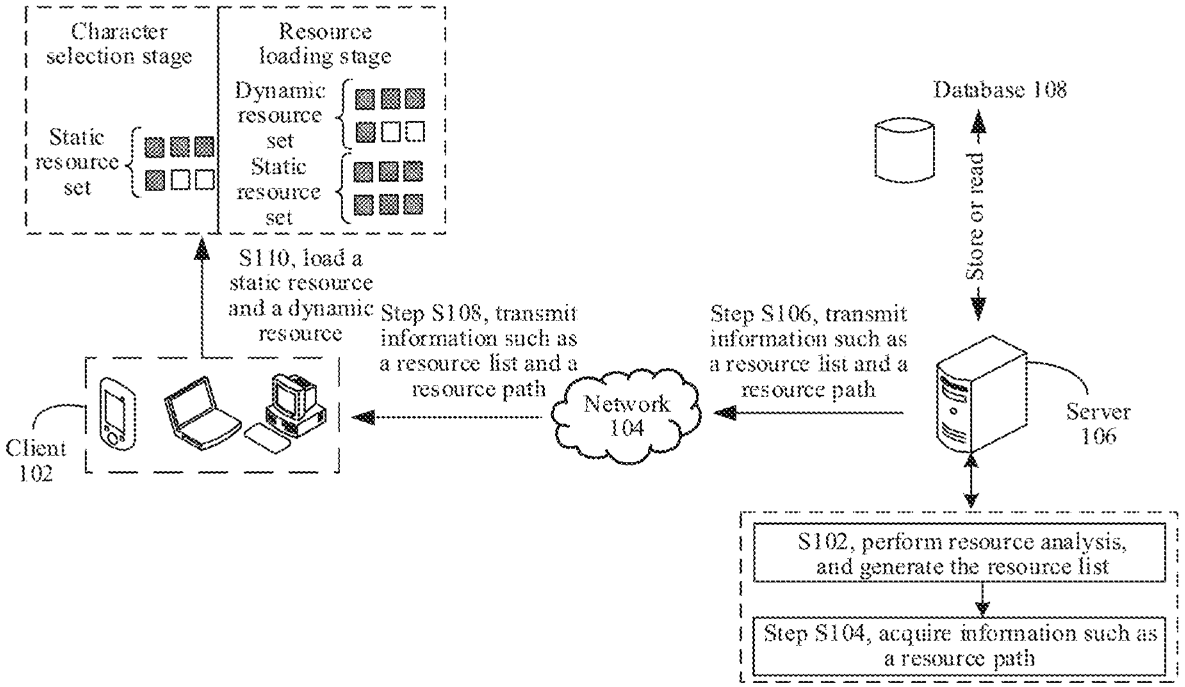
FIG. 1 is a schematic diagram of an application scenario of an optional resource preloading method according to some embodiments.
Figure 3:
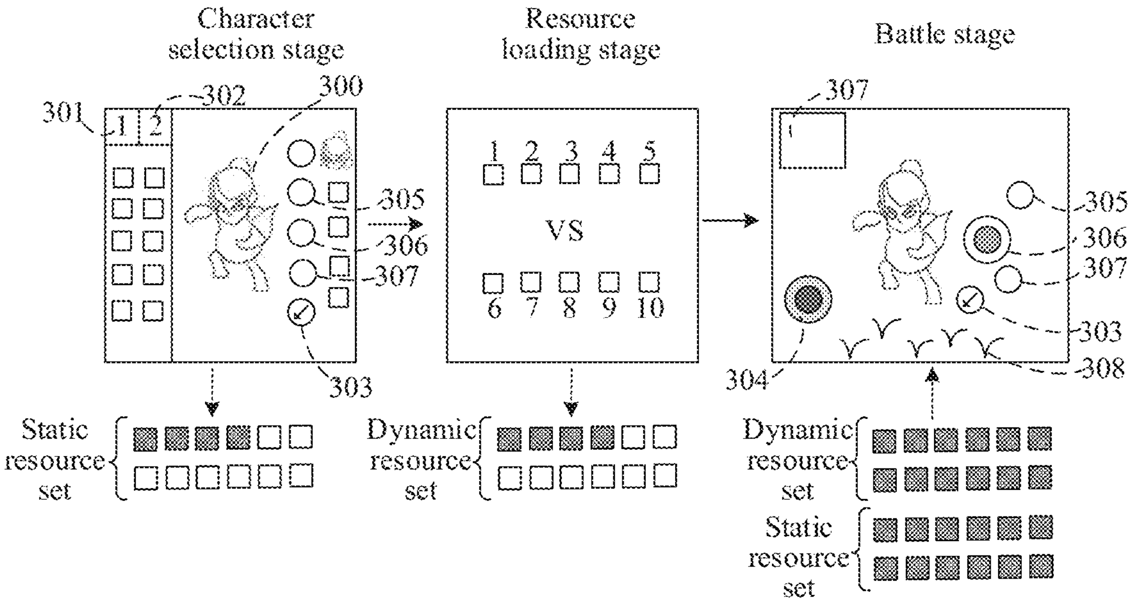
FIG. 3 is a schematic diagram of an optional resource preloading method according to some embodiments.

Some embodiments provide a resource preloading method. The resource preloading method may be, but is not limited to, a resource preloading system applied to an application scenario as shown in FIG. 1. The resource preloading system may include, but is not limited to, a client 102, a network 104, a server 106, and a database 108. The client 102 includes a human-computer interaction screen, a processor, and a memory. The human-computer interaction screen is configured to display a game interface (a display screen for loading resources used in a current round, for example a current round of the game, as shown in FIG. 3) of a client, and is also configured to provide a human-computer interaction interface to receive a human-computer interaction operation for users to perform a game battle by using game software. The processor is configured to generate an interactive instruction in response to the human-computer interaction operation, and transmit the interactive instruction to the server 106. The memory is configured to store related attribute data, such as resource path information, character selection information, and game battle screen information. The client 102 may also be referred to as a terminal. The client 102 may include, but is not limited to, various desktop computers, notebook computers, smart phones, tablet computers, Internet of Things devices, and portable wearable devices. The Internet of Things devices may be smart speakers, smart televisions, smart air conditioners, smart on-board devices, and other devices. The portable wearable devices may be smart watches, smart bracelets, head-mounted devices, and the like. The server 106 may be implemented by an independent server or a server cluster composed of a plurality of servers or a cloud server.

A specific process is as follows: Operation S102: Analyze a resource required for a current round, and generate a resource list. In embodiments, a resource required for a round may refer to, for example, at least one of a resource which is used for a round, a resource which is intended to be used for a round, and a resource which is expected to be used for a round. Operation S104: Acquire information such as a resource path from the resource list. Then, as operations S106-108, the server 106 transmits information such as the resource list and the resource path to the client 102 through the network 104. Operation S110: The client 102 receives the resource list and the resource path, and loads a resource to be referenced by the current round, including a static resource and a dynamic resource. The above is merely an example, and any limitation is not made thereto in this embodiment.

In some embodiments, a static resource set of a round is preloaded by using idle time during a character selection stage, and then a dynamic resource set of the round is loaded during a resource loading stage based on the loading of the static resource set being completed, which avoids frame rate lag caused by excessive resource loading time in the round, and achieves a purpose of shortening resource loading duration, thereby resulting in a technical effect of improving the resource loading efficiency, and solving a technical problem of excessive resource loading time caused by a large quantity of game resources.

In some embodiments, no limitation is made to execution subjects of the operations S102 to S110 in this embodiment. For example, all of the operations S102 to S110 may be performed on the client 102.

Taking the resource preloading method provided by this application being applied to a computer device as an example, the computer device may be a terminal or a server, and the resource preloading method is executed independently by the terminal or the server, or may also be implemented through the interaction between the terminal and the server.

Figure 2:
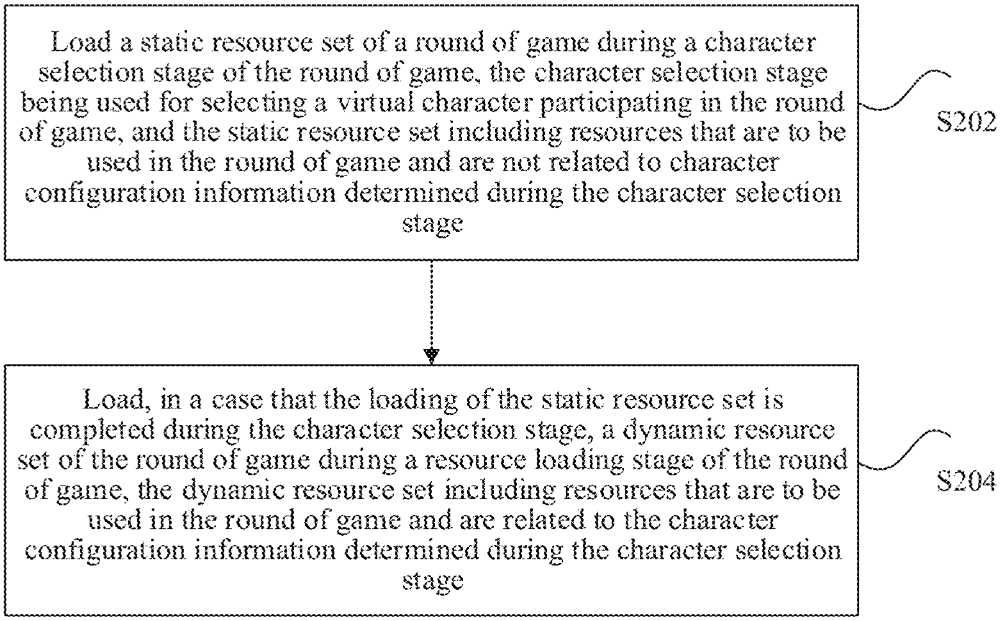
FIG. 2 is a flowchart of an optional resource preloading method according to some embodiments.

Some embodiments provide, as shown in FIG. 2, a resource preloading method. Taking the method being applied to a computer device as an example, the computer device may be a terminal or a server, and the resource preloading method is executed independently by the terminal or the server, or may be implemented through the interaction between the terminal and the server. FIG. 2 is a flowchart of a resource preloading method according to an embodiment. The flow includes the following operations:

Operation S202: Load a static resource set of a round during a character selection stage of the round, the character selection stage selecting a virtual character participating in the round, and the static resource set including resources that are to be used in the round and are not related to character configuration information determined during the character selection stage.

In some embodiments, the static resource set includes, but is not limited to, resources that are not related to character configuration information determined during the character selection stage. The character configuration information may include, but is not limited to, a character, a skill, a skin, and other information determined during the character selection stage. During the character selection stage, the character configuration information may continuously change with an input instruction. The character configuration information may be partially or completely different in two different rounds of game. Further, the resource that is not related to the character configuration information may indicates that these static resources and the character configuration information are independent of each other. In other words, resources in the static resource set in this embodiment are the resources that do not change with the character configuration information determined during the character selection stage, for example, the static resource set includes a resource corresponding to grass 408 in FIG. 4.

Operation S204: Load, based on the loading of the static resource set being completed during the character selection stage, a dynamic resource set of the round during a resource loading stage of the round, the dynamic resource set including resources that are to be used in the round and are related to the character configuration information determined during the character selection stage.

In some embodiments, the dynamic resource set includes resources that are related to character configuration information determined during the character selection stage, and the dynamic resource in the dynamic resource set will change with changes of selected characters and differences of active selections of players, such as skills, skins, or star coins, and the dynamic resource of each round may be different. The resources in the dynamic resource set in this embodiment are the resources that will change with changes of the character configuration information, for example, the dynamic resource set includes resources corresponding to a character 300 and a skill 303 in FIG. 3.

In this embodiment, the resources to be used in a round include, but are not limited to, static resources and dynamic resources. Before entering a battle stage of a game, a game screen of a battle stage of the game can be displayed only by completing the loading of all of the static resources and the dynamic resources required for the current round and then rendering the loaded static resource set and dynamic resource set.

In a some resources loading methods, both the loading of the static resources and the loading of the dynamic resources are completed during the resource loading stage. During the character selection stage, offline analysis is only performed on the resources to be used in the current round, different labels are set for the resources obtained by offline analysis to distinguish their categories, and then a corresponding resource list is generated. However, as the complexity of the game becomes higher, the quantity of resources required for a single round will also increase, resulting in excessive time during the resource loading stage, and reducing the user experience.

In some embodiments, in order to solve the problem of excessive time during the resource loading stage, in this embodiment, the static resource set of the round is preloaded by using the idle time during the character selection stage, and then the dynamic resource set of the round is loaded during the resource loading stage based on the loading of the static resource set being completed.

Specifically, as shown in FIG. 3, during the character selection stage, assuming that a player selects the character 300 from a character list 301 (for example, a hero list) as required during the character selection stage, may select a skin of the character 300 from a skin list 302, and meanwhile, select a skill (for example, a skill 303 and skills 305-307 in the figure) possessed by the character 300 in the current round. Taking a 5 vs 5 MOBA game (as shown in a resource loading stage in FIG. 3, characters 1 to 5 form a team, characters 6 to 10 form a team, and the character 300 may be, but is not limited to, a character 1 during the resource loading stage) as an example, during the character selection stage, the static resource set of this game may be preloaded, and the static resource set may include, but is not limited to, resources that are not related to character configuration information determined during the character selection stage in FIG. 3. The character configuration information may be, but is not limited to, the character 300, the skin corresponding to the character 300, the skill 303 used by the character 300 in this game, and other information determined during the character selection stage. The static resource set may include, but is not limited to, a scenario element (for example, grass and a wall body) and a resource corresponding to an NPC in a map displayed during a battle stage in FIG. 3. During a battle stage, a thumbnail map corresponding to skill 307 may also be displayed. In some embodiments, the scenario element (for example, the grass and the wall body) and the resource corresponding to the NPC may be understood as the resources required for displaying (or referred to as rendering) the scenario element and the NPC during the battle stage.

The dynamic resource set of the round is loaded during a resource loading stage based on the static resource set being loaded. The dynamic resource set includes, but is not limited to, resources that are related to character configuration information determined during the character selection stage in FIG. 3. The character configuration information may include, but is not limited to, the character 300, the skin corresponding to the character 300, the skill 303 used by the character 300 in this game, and other information determined during the character selection stage. The dynamic resource set displays corresponding screen elements during the battle stage, for example, a virtual button corresponding to the skill 303, the virtual button corresponding to the skill 305, the virtual button corresponding to the skill 306, the virtual button corresponding to the skill 307, a virtual joystick 304, and other elements. In some embodiments, the dynamic resource set may be understood as the resources required for displaying (or referred to as rendering) the corresponding screen elements during the battle stage.

As described, the static resource in the embodiment may be, but is not limited to, a resource that is not related to the character configuration information determined during the character selection stage. The dynamic resource may be, but not limited to, a resource that is related to the character configuration information determined during the character selection stage. For example, the static resource is a resource that does not change when entering a battle of a fixed level such as matching or qualifying based on a game mode (for example, matching or qualifying) being determined. The dynamic resource will change with changes of selected characters and differences of active selections of players, such as summoner skills, skins, or star coins, and the dynamic resource of each round may be different. It can be seen that the static resource is a resource that does not change with a change of the character configuration information, and the dynamic resource is a resource that changes with the change of the character configuration information.

Figure 4:
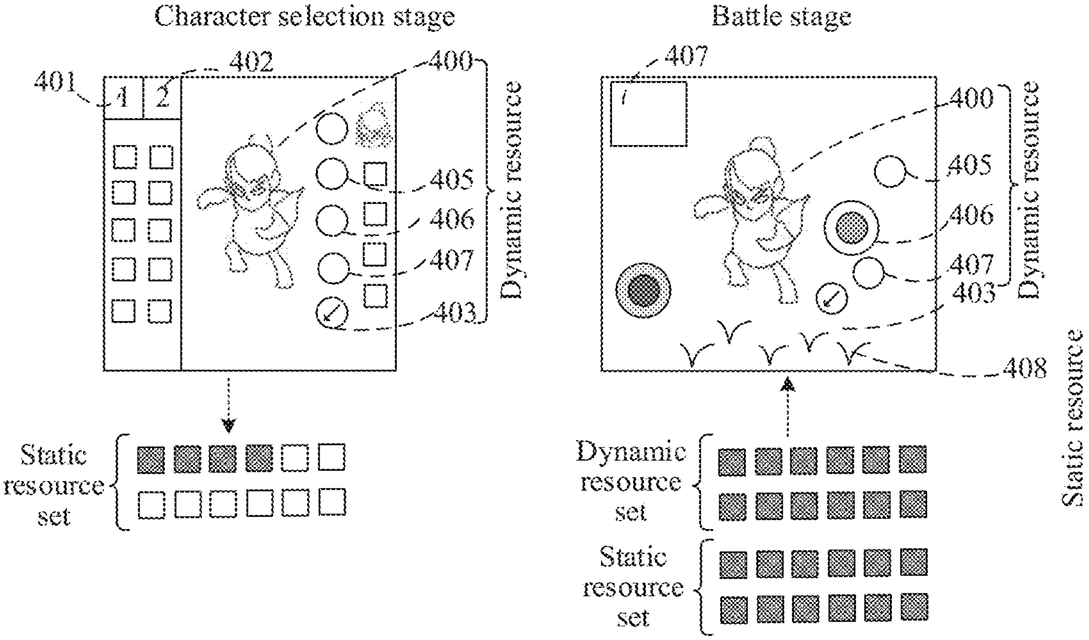
FIG. 4 is a schematic diagram of an optional static resource set and dynamic resource set according to some embodiments.

In order to further describe a resource preloading process in this embodiment, a detailed description will be given below with reference to FIG. 4. As shown in FIG. 4, during a character selection stage, a player may determine corresponding character configuration information according to personal preference. The character configuration information may include, but is not limited to: a character 400 selected from a character list 401, a skin selected for the character 400 from a skin list 402, a skill 403 and skills 405-407 used by the character 400 in this game, and other information. Before the character selection stage ends, part or all information in the character configuration information may be changed. Therefore, the resources corresponding to the character 400, the skin selected for the character 400, and the skill 403 used by the character 400 in this game belong to the dynamic resources. The static resource set that needs to be preloaded during the character selection stage may include, but is not limited to, resources that are not related to the character configuration information, for example, the resources corresponding to scenario elements (for example, grass 408 and a wall body) and an NPC in a map displayed during a battle stage in FIG. 4. The resources corresponding to the scenario elements and NPC will not change with the change of the character configuration information. Therefore, the resources corresponding to the scenario elements and NPC all belong to the static resources.

Through an embodiment provided by this application, the static resource set is preloaded by using idle time during the character selection stage, and then the dynamic resource set of the round is loaded during the resource loading stage based on the loading of the static resource set being completed, which avoids frame rate lag caused by excessive resource loading time in the round, and achieves a purpose of shortening resource loading duration, thereby achieving a technical effect of improving the resource loading efficiency, and solving a technical problem of excessive resource loading time caused by a large quantity of game resources.

In some embodiments, the resource preloading method further includes:

based on the loading of partial static resources in the static resource set being completed during the character selection stage, loading a dynamic resource set of the round and loading static resources, except the partial static resources, in the static resource set during the resource loading stage of the round.

It can be understood that, before entering the resource loading stage, a loading state of the static resource at least includes the following two cases:

first: the preloading of all static resources is completed during the character selection stage; and second: partial static resources are preloaded during the character selection stage.

Remaining partial static resources that are not loaded during the character selection stage in the second case are loaded during the resource loading stage.

Figure 5:
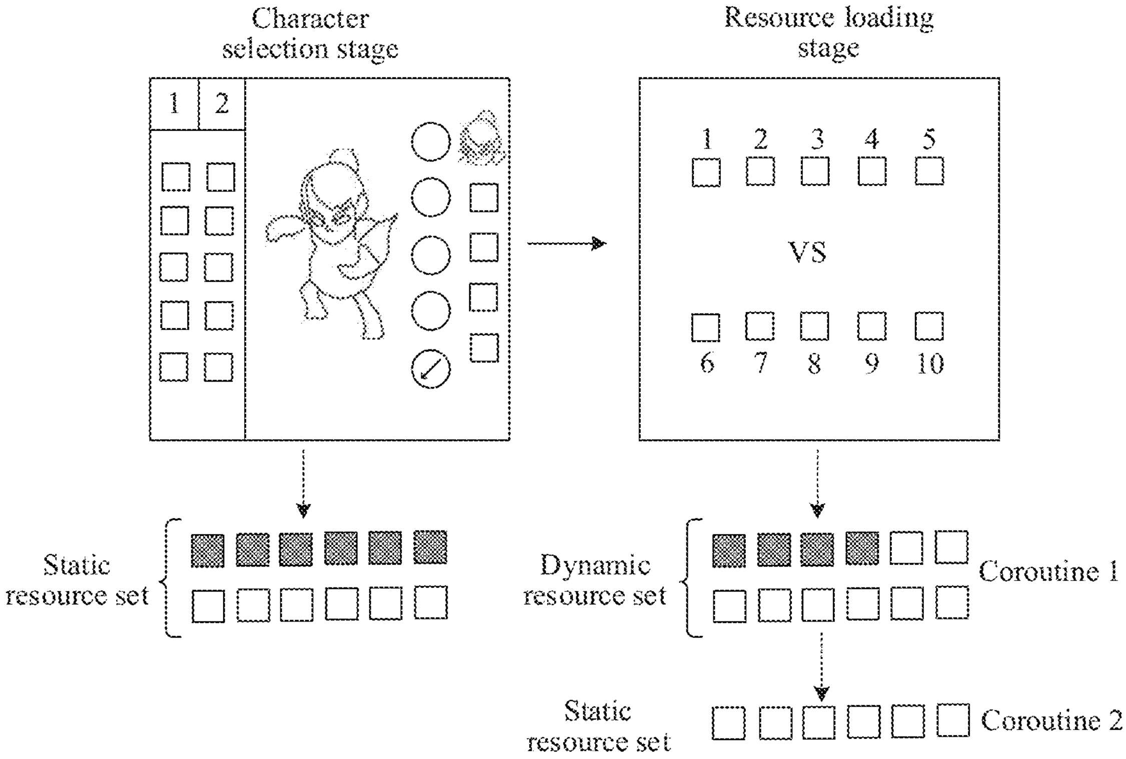
FIG. 5 is a schematic diagram of a loading state of an optional static resource set and dynamic resource set according to some embodiments.

In order to further describe the second case in this embodiment, a detailed description will be given below with reference to FIG. 5. As shown in FIG. 5, only 50% of static resources in the static resource set are loaded during the character selection stage. Thus, during the resource loading stage, all dynamic resources in the dynamic resource set and the remaining 50% of the static resources in the static resource set may be respectively loaded through a coroutine 1 and a coroutine 2.

Through an embodiment provided by this application, a type and a quantity of resources to be loaded during the resource loading stage may be determined according to a completion state of loading the static resource set during the character selection stage, which reduces the quantity of the resources to be loaded during the resource loading stage, shortens the resource loading time, and improves the user experience.

In this embodiment, the dynamic resource set and the remaining static resources in the static resource set are respectively loaded by using different coroutines as shown in FIG. 5 during the resource loading stage. In this embodiment, the dynamic resource set and the remaining static resources in the static resource set may also be loaded in other manners during the resource loading stage, for example, the dynamic resource set and the remaining static resources in the static resource set are loaded sequentially by using the coroutine 1 during the resource loading stage.

In some embodiments, the operation of loading a dynamic resource set of the round and loading static resources, except partial static resource, in the static resource set during the resource loading stage of the game includes: loading the dynamic resource set of the round and the static resources, except the partial static resources, in the static resource set concurrently during the resource loading stage of the round.

In this embodiment, during the resource loading stage, all dynamic resources in the dynamic resource set will also be loaded in addition to loading partial static resources that are not loaded during the character selection stage.

Figure 6:
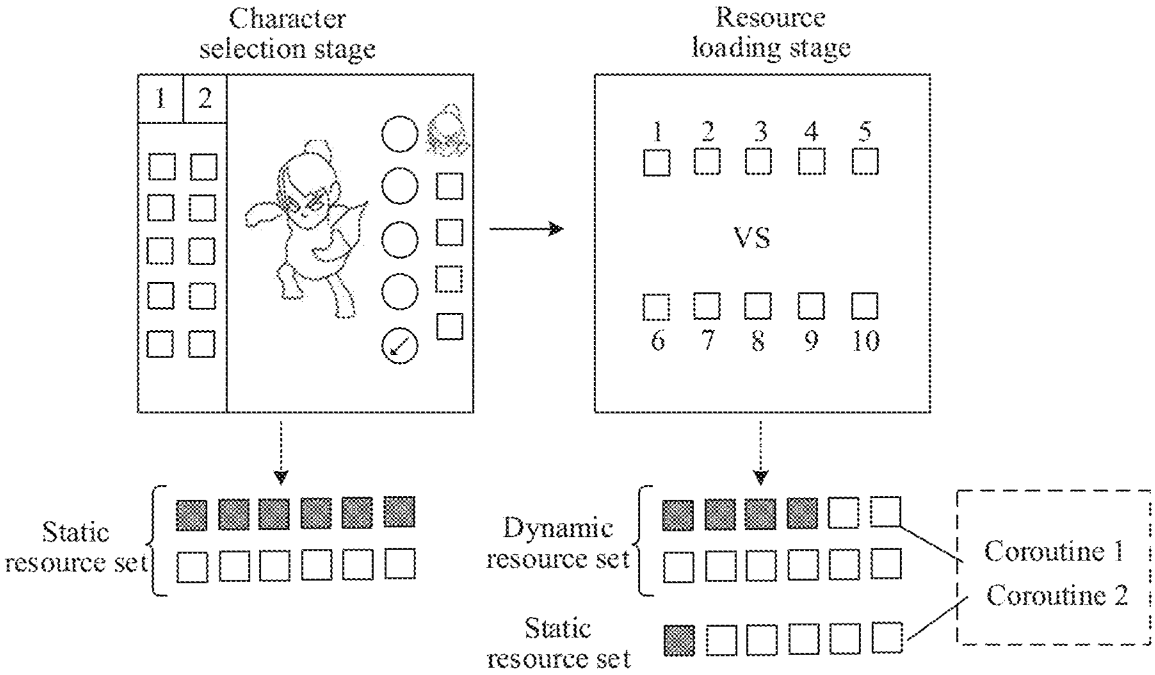
FIG. 6 is a schematic diagram of a loading state of another optional static resource set and dynamic resource set according to some embodiments.

In order to further describe a process of loading resources concurrently during the resource loading stage in this embodiment, a detailed description will be given below with reference to FIG. 6. Specifically, as shown in FIG. 6, only 50% of static resources in the static resource set are loaded during the character selection stage. During the resource loading stage, all dynamic resources and the remaining 50% of the static resources in the static resource set are loaded concurrently through a coroutine 1 and a coroutine 2 until the loading is completed.

According to an embodiment provided by this application, it can be seen that, during the resource loading stage, there are at least two loading manners for partial static resources that are not loaded and all dynamic resources during the character selection stage:

In embodiments, the first loading manner may include loading the remaining partial static resources that are not loaded (or dynamic resources) first, and then loading the dynamic resources (or the static resources), that is, loading two types of resources in series; and In embodiments, the second loading manner may include simultaneously loading the remaining partial static resources that are not loaded and the dynamic resources, and then loading two types of resources concurrently.

In some embodiments, either of the two different loading manners may be selected according to a situation, for example, either of the two different loading manners may be selected according to a proportion of the unloaded static resources during the character selection stage. For example, the first loading manner may be selected when the unloaded static resources during the character selection stage are less than or equal to 50%; and the second loading manner may be selected when the unloaded static resources during the character selection stage are greater than 50%. Part or all static resources are preloaded during the character selection stage in the two loading manners, so the quantity of resources that may be loaded during the resource loading stage is reduced in the two loading manners.

Through an embodiment provided by this application, based on the loading of the static resources being not completed during the character selection stage, the loading of all resources is completed in a manner of loading the static resources and the dynamic resources concurrently or asynchronously during the resource loading stage, which improves the flexibility of a resource loading manner, reduces the resource loading duration, and achieves a technical effect of improving the resource loading efficiency.

In some embodiments, the resource preloading method further includes:

displaying first prompt information during the character selection stage based on the static resource set of the round being loaded during the character selection stage of the round, the first prompt information prompting that part resources of the round have been preloaded; or second prompt information is displayed during the resource loading stage based on the static resource set of the round being loaded during the character selection stage of the round, the second prompt information prompting that part resources of the round have been preloaded.

In order to reflect the loading state of the resources more intuitively, the first prompt information for preloading the static resource is set in a display interface during the character selection stage in this embodiment, which displays a loading progress of the static resources; or, the second prompt information is set in the display interface during the resource loading stage, which displays the proportion of the resources that have been preloaded at a current time to the total resources.

In order to further describe the prompt process in this embodiment, a detailed description will be given below with reference to FIG. 7. Specifically, as shown in (a) in FIG. 7, when 30% of static resources have been loaded during the character selection stage, a progress bar of "30% has been preloaded" may be displayed in the display interface during the character selection stage. It is easily understood that, with the change of the resource loading progress, a number in the progress bar will also change, for example, as the loading capacity of the static resources increases, prompt information, such as "40% has been preloaded" and "50% has been preloaded", is dynamically displayed.

In some embodiments, the second prompt information may also be displayed in the display interface of the resource loading stage, the second prompt information may include, but is not limited to, the proportion of the static resources that have been preloaded to the total resources of the game during the character selection stage. The total resources of the game may include the static resource set and dynamic resource set. In some embodiments, the second prompt information may, but is not limited to, be started to display at a moment when the character selection stage ends and the resource loading stage jumps, for example, "70% preloaded for you" as shown in (b) in FIG. 7.

In some embodiments, the first prompt information is used for indicating to update the proportion of the static resources that have been preloaded to the total resources of the game in real time during the character selection stage, and the second prompt information is used for indicating the proportion of the static resources that have been preloaded to the total resources during the character selection stage, in other words, the second prompt information may be the same as the first prompt information when the character selection stage ends.

Therefore, based on the meanings respectively indicated by the first prompt information and the second prompt information and a relationship between the two, there is at least one of the following displaying manners for the first prompt information and the second prompt information in display interfaces during the character selection stage and the resource loading stage:

In embodiments, a first displaying manner may include only displaying the first prompt information during the character selection stage, and not displaying the second prompt information during a resource selection stage;

In embodiments, a second displaying manner may include not displaying the first prompt information during the character selection stage, but displaying the second prompt information during the resource selection stage; or In embodiments, a third displaying manner may include displaying the first prompt information during the character selection stage, and displaying the second prompt information during the resource selection stage.

Through an embodiment provided by this application, a resource preloading state is intuitively reflected in a manner of displaying the first prompt information during the character selection stage, and/or displaying the second prompt information during the resource loading stage, so that the resource loading progress may be understood in real time while shortening the resource loading time, the resource loading efficiency is improved, and the user experience is improved.

Figure 7:
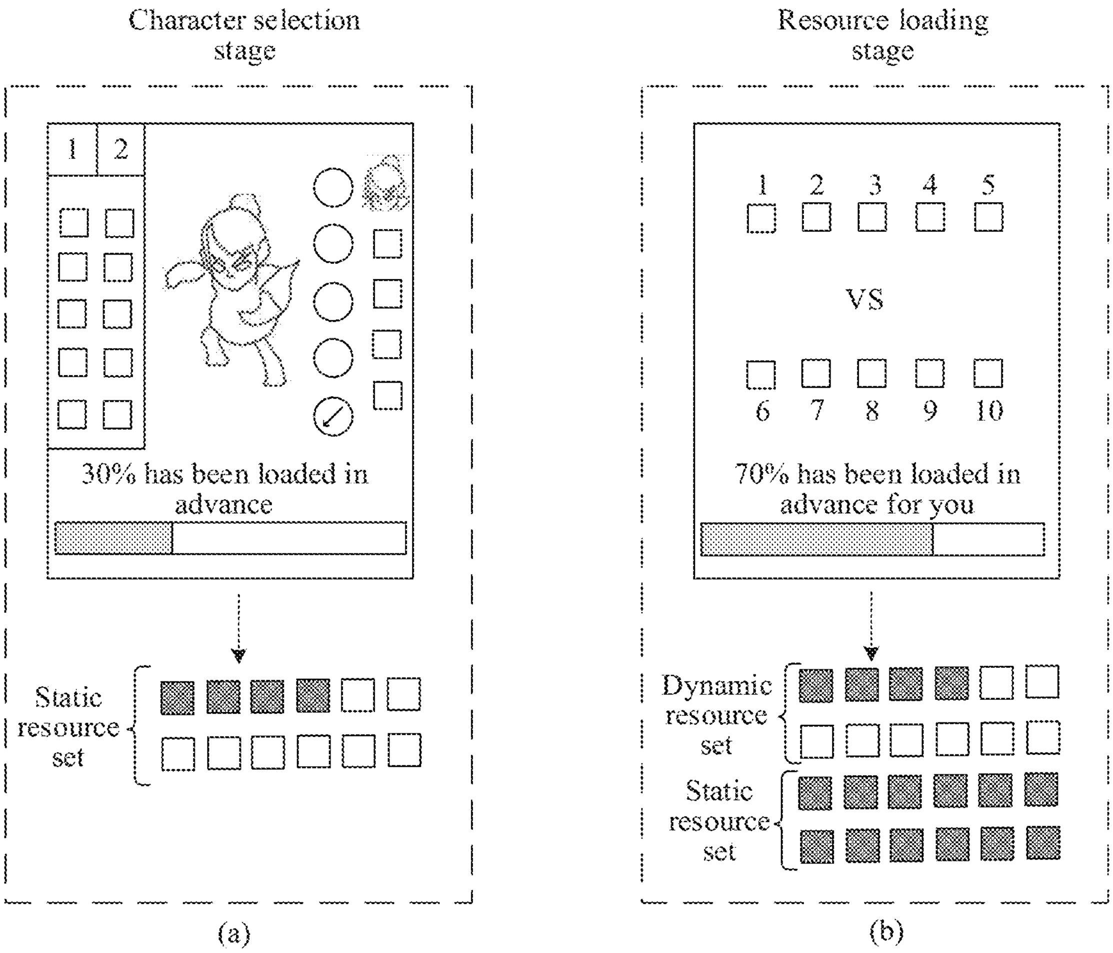
FIG. 7 is a schematic diagram of a loading state of still another optional static resource set and dynamic resource set according to some embodiments.

Prompting a resource loading situation in a manner of using a progress bar as shown in FIG. 7 is only an example. In this embodiment, the first prompt information and second prompt information may also be displayed in other manners, for example, the resource loading situation is prompted in manners of text, icons, audio, or animation, or various combinations of the manners during the character selection stage.

In some embodiments, the operation of loading a static resource set of a round during a character selection stage of the round includes:

various static resource subsets in the static resource set are loaded sequentially or concurrently during the character selection stage, the various static resource subsets including at least one of the following:

a scenario resource subset in the round, the scenario resource subset including a resource of a virtual object appearing on a game map in the round; or an NPC resource subset in the round, the NPC resource subset including resources of one or more NPCs in the round.

In each embodiment of this application, different labels are set for all static resources in the static resource set according to the classification of resource types. For example, all static resources are divided into four categories according to types and four offline static resource configuration tables are generated, including:

1) Preloading an offline basic resource configuration table, including fields: identity (ID), resource path, resource type, number of resource instantiations, and other information;
2) Preloading an offline skill resource configuration table, including fields: resource type, resource path, player ID, configuration ID, skin ID, and other information;
3) Preloading an offline minion lane (for example, NPC) resource configuration table, including fields: configuration ID, character type, character camp, and other information;
4) Preloading a scenario resource configuration table, including fields: ID, resource scenario path, and other information.

It is to be understood that the classification manner is merely an example. In this embodiment, the static resources may be classified in other classification manners, for example, part categories of the four categories may be included, or the static resources are classified according to other classification conditions different from the four categories.

Figure 8:
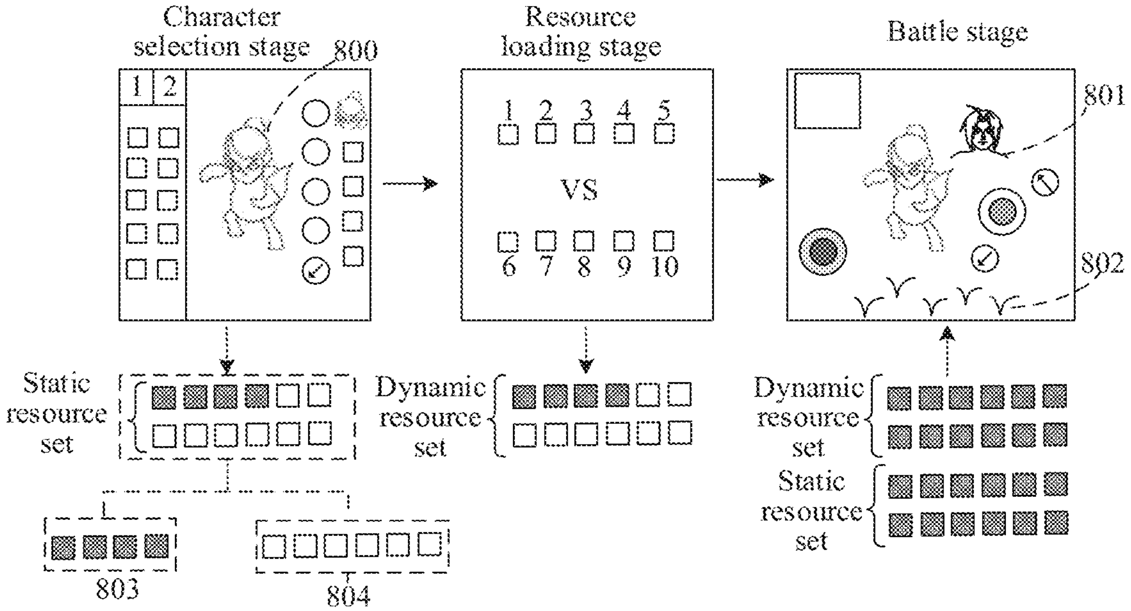
FIG. 8 is a schematic diagram of a loading state of still another optional static resource set and dynamic resource set according to some embodiments.

In order to further describe processes of preloading different types of resources in this embodiment, a detailed description will be given below with reference to FIG. 8. Specifically, as shown in FIG. 8, the static resource set includes two static resource subsets during the character selection stage. This embodiment does not limit the quantity of the static resource subsets included in the static resource set, for example, 3, 4, or 5 static resource subsets may be included. In some embodiments, according to a resource type, the static resource subsets may include a scenario resource subset 803. The scenario resource subset 803 includes, but is not limited to, a resource corresponding to a virtual object appearing on a game map in a game, for example, a resource corresponding to grass 802 appearing on the game map during a battle stage, a resource corresponding to a wall body appearing on the game map, and a resource corresponding to a lamp appearing on the game map.

According to the resource type, the static resource subsets may include an NPC resource subset 804. The NPC resource subset 804 includes the resources corresponding to one or more NPCs in a game, for example, the NPC resource subset 804 includes, but is not limited to, a resource of an NPC 801 as shown in FIG. 8. It is easily understood that, the quantity of the NPCs in a game is not limited, which may be one or more as required.

During the character selection stage, loading manners for the scenario resource subset 803 and the NPC resource subset 804 include, but are not limited to, the following two manners:

first: loading the scenario resource subset 803 and the NPC resource subset 804 sequentially; and second: loading the scenario resource subset 803 and the NPC resource subset 804 simultaneously.

The scenario resource subset 803 and the NPC resource subset 804 are only exemplary. In an actual game battle process, the quantity and types of the static resource subsets in the static resource set that needs to be used in a game are not limited. Correspondingly, the loading manners for a plurality of static resource subsets include, but is not limited to, loading various static resource subsets sequentially or concurrently.

Further, during a game development stage, a master usually pre-configures the resources required to be used in different game modes during an editor stage, and generates static resource configuration tables referenced with game levels, for example, a resource corresponding to a color of grass on a game map and a resource corresponding to a position of an NPC in the embodiment. Moreover, an editing panel special for loading resources is also developed in an editor. Relevant data in a game resource loading process may also be displayed through the editing panel.

Figure 9:
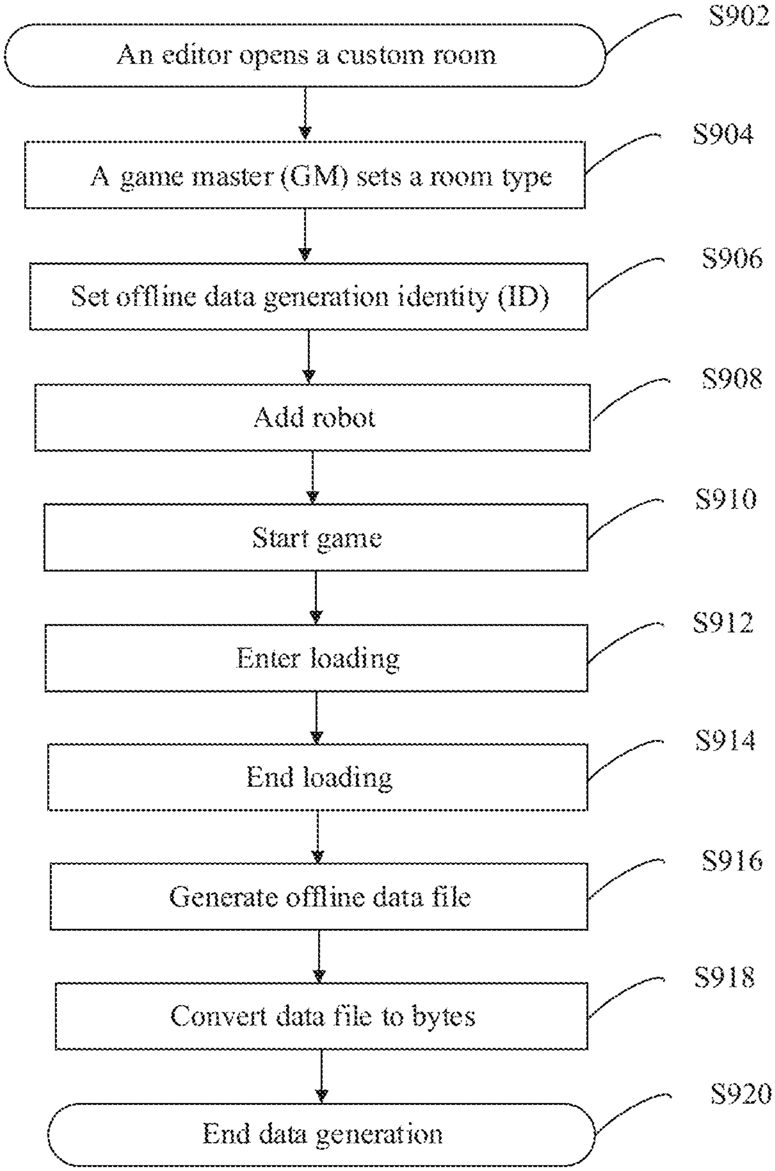
FIG. 9 is an optional flowchart of generating an offline static resource according to some embodiments.

In some embodiments, before entering the character selection stage, the master also needs to generate an offline static resource in advance during the editor stage. Specifically, refer to a flowchart as shown in FIG. 9.

A panel special for loading resources is developed. Different labels are set for all resource loading analysis functions by opening "whether to generate an offline and analysis file" in the panel special for loading the resources during the editor stage, so as to distinguish whether the resources analyzed in the resource analysis functions are static resources or dynamic resources. If a resource cannot be distinguished, it is defined as a dynamic resource. After opening "whether to generate an offline and analysis file", analysis functions of all dynamic resources will be closed during the resource loading stage, and only the analysis functions labeled as the static resources run, specifically, as operations S902-S914.

After all static resources are analyzed through "whether to generate an offline and analysis file", the loading of the resources is ended, a button "generate offline data" in the panel special for loading the resources is clicked, and all static resources analyzed by the resource analysis function are classified according to the types to generate four offline static resource configuration tables, specifically, as operations S916-S920.

Further, after the offline static resources are generated during the editor stage, resource preloading may be performed on each static resource subset in the static resource set during the character selection stage.

Through an embodiment provided by this application, the static resource configuration tables are generated according to the offline static resources analyzed during the editor stage, and then various types of static resources in the static resource configuration tables are preloaded by using idle time during the character selection stage, which reduces the quantity of the resources during the resource loading stage, shortens the loading time during the resource loading stage, and achieves a technical effect of improving the resource loading efficiency.

In some embodiments, the operation of loading various static resource subsets in the static resource set sequentially or concurrently during the character selection stage includes:

the following operations are repeated until the character selection stage ends or the loading of the various static resource subsets is completed:

storing the resource path information of the current static resource in the target resource list, based on a current static resource to be used in the round being determined and resource path information of the current static resource being not stored in a target resource list;

acquiring the resource path information of unloaded partial static resources sequentially or concurrently from the target resource list, and loading the partial static resources according to the resource path information of the partial static resources;

performing in-round object instantiating on the loaded partial static resources to obtain an instantiated object of the partial static resources; and storing the instantiated object of the partial static resources in an object buffer pool.

In this embodiment, when entering the character selection stage, four key coroutines of the resource preloading stage will be triggered. Specifically, as shown in FIG. 10:

1) a resource analysis coroutine: the analysis coroutine will continuously analyze the resources to be referenced in this game and save them in a resource list;
2) a resource loading coroutine: the loading coroutine acquires information such as a resource path from the resource list, and starts loading;
3) a resource instantiation coroutine: the instantiation coroutine acquires the resources that have been loaded from the resource list and performs in-round object instantiation;

4) a resource pool recycling coroutine: the recycling coroutine recycles a resource loading instantiation object to an object buffer pool.

Figure 10:
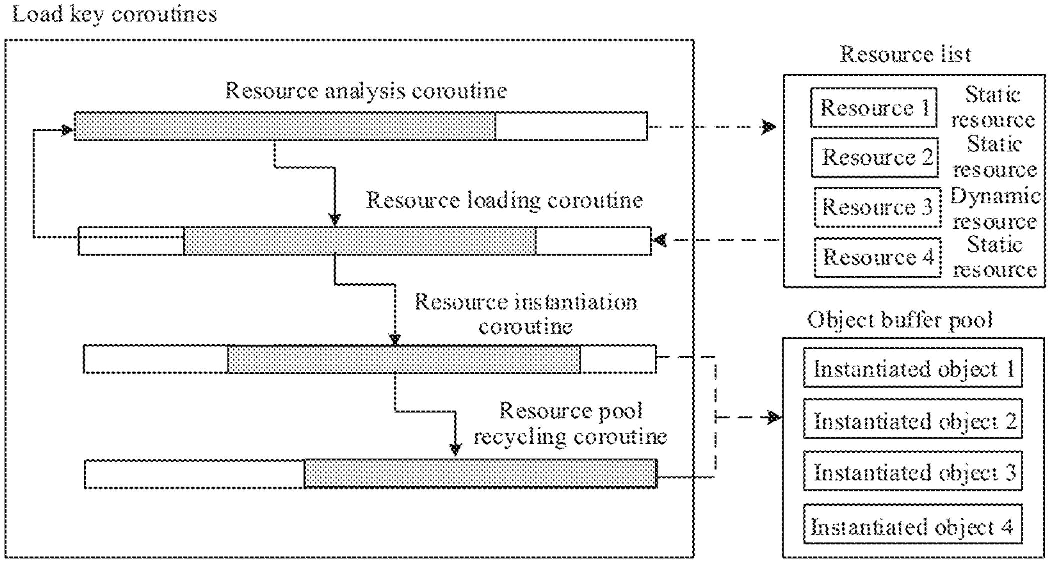
FIG. 10 is a schematic diagram of a key coroutine of an optional resource loading stage according to some embodiments.

All resources required to be used in the current round will be analyzed by the resource analysis coroutine, the analyzed resources are numbered, classification labels of "static resource" or "dynamic resource" are set for the resources with different numbers, and then the resource list as shown in FIG. 10 is generated. The types of a resource 1, a resource 2, and a resource 4 are "static resources", and the type of a resource 3 is a "dynamic resource". A current static resource to be used in a current round is determined according to a resource number and a classification label, and resource path information of the current static resource is stored in the resource list.

During the character selection stage, the resource path information of partial static resources that are not loaded is acquired sequentially or concurrently from the resource list through the resource loading coroutine, for example: assuming that the static resources not loaded at the current time includes the resource 1 and the resource 2, then path information of the resource 1 is acquired first, and the resource 1 is loaded; and then, path information of the resource 2 is acquired, and the resource 2 is loaded; or, the path information of the resource 1 and the resource 2 are acquired simultaneously, and the resource 1 and the resource 2 are loaded simultaneously.

After the loading of the resource 1 and the resource 2 is completed, enter the resource instantiation coroutine to perform instantiation on in-round objects corresponding to the loaded resource 1 and resource 2 to obtain instantiated objects. For example, the in-round object corresponding to the resource 1 is NPC, the in-round object corresponding to the resource 2 is grass on a game map, and then an instantiated object 1 (for example, an NPC) and an instantiated object 2 (for example, grass) as shown in FIG. 10 are obtained by performing object instantiation on the resource 1 and the resource 2. Then, the instantiated object 1 and the instantiated object 2 are stored in an object buffer pool through the resource pool recycling coroutine, so that the resource 1 and the resource 2 that have been preloaded may be directly acquired from an object buffer pool in a next round.

Further, during the character selection stage, the four coroutines in this embodiment will be simultaneously triggered. An execution sequence of the four coroutines is still explained and described by using the embodiment as shown in FIG. 10, for example:

S1, a current static resource (the resource 1 and the resource 2) to be used in a current round is determined according to the resource analysis coroutine, and resource path information of the resource 1 and the resource 2 are stored in the resource list;

S2, the resource 1 and the resource 2 are loaded by the resource loading resource according to the resource path information of the resource 1 and the resource 2;

S3, in-round object instantiation is performed on the resource 1 and the resource 2 that have been loaded through the resource instantiation coroutine; and S4, the instantiated object 1 and object 2 are recycled to the object buffer pool through the resource pool recycling coroutine.

Operations of S1 to S4 are repeated until the character selection stage ends or the loading of all static resources required for the current round is completed.

The resources are loaded by using the four coroutines and working manners of the four coroutines as shown in FIG. 10, which is only an example. In this embodiment, the resources may also be loaded by using other quantities of coroutines and/or other working manners, for example, the difference from the manner shown in FIG. 10 is that the operations S3 and S4 are completed by using one coroutine.

Through an embodiment provided by this application, a plurality of key coroutines during the character selection stage are used, various static resource subsets in a static resource set required for a game are loaded sequentially or concurrently in the resource loading coroutine, then instantiated objects corresponding to the various static resource subsets that have been loaded are stored in the object buffer pool through the resource instantiation coroutine and the resource pool recycling coroutine, so that this part of static resources that are preloaded may be repeatedly used in a next round, which shortens the resource loading time, avoids frame rate lag caused by excessive resource loading time, and improves the user experience.

In some embodiments, based on the loading of partial static resources in the static resource set being completed during the character selection stage, the operation of loading a dynamic resource set of a round and loading static resources, except partial static resources, in the static resource set during the resource loading stage of the round includes: pausing, based on the character selection stage ending in response to completing the loading of the partial static resources during the character selection stage, the loading of the static resource, starting the loading of the dynamic resource set of the round at a beginning of the resource loading stage, and continuing the loading of the static resources, except the partial static resources, in the static resource set.

Figure 11:
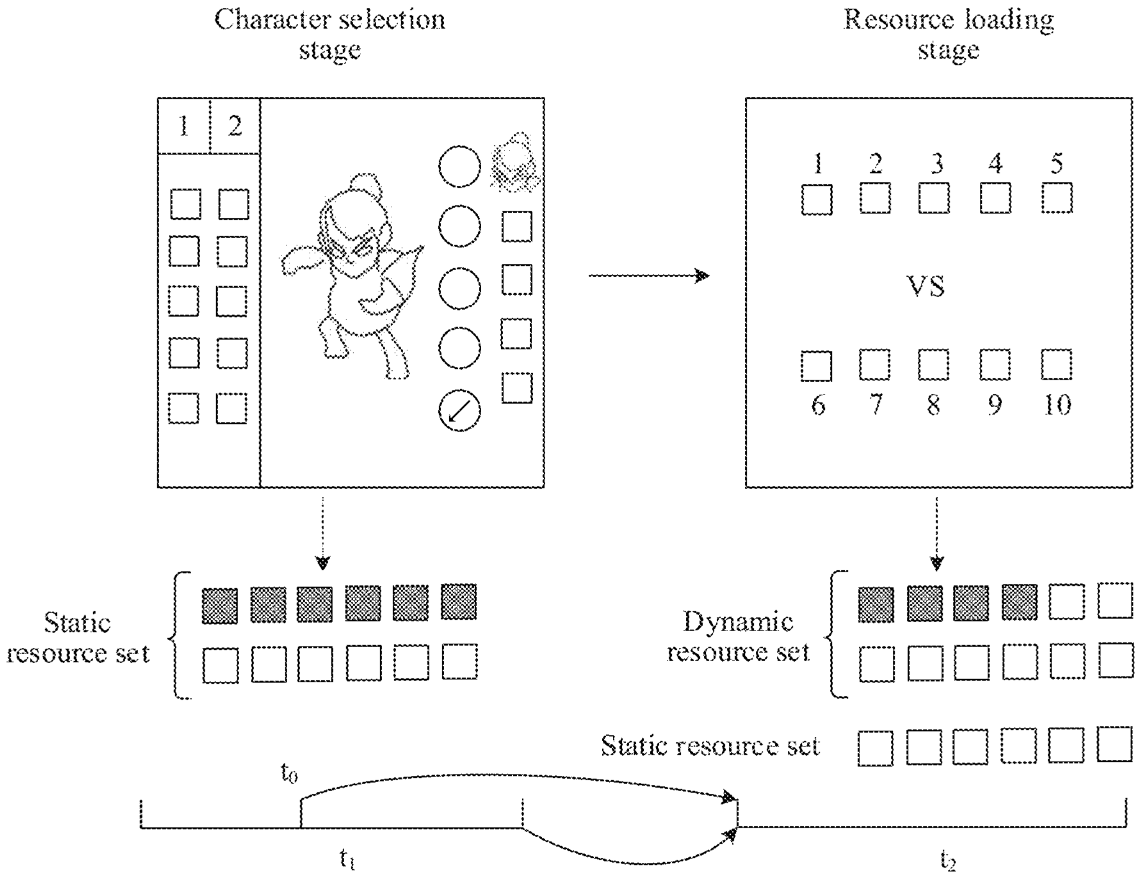
FIG. 11 is a schematic diagram of an optional character selection stage ending manner according to some embodiments.

In order to further describe a stage skipping process in this embodiment, a detailed description will be given below with reference to FIG. 11. Specifically, as shown in FIG. 11, the maximum allowed selection time t1 is configured for a character selection stage of a game in advance, that is, the determination of character configuration information is required to be completed by all players within the maximum allowed selection time t1. If exceeding the t1, directly skip to a resource loading stage. As shown in FIG. 11, the time of the resource loading stage is t2. In a scenario as shown in FIG. 11, conditions for skipping from the character selection stage to the resource loading stage include, but are not limited to, the following two conditions:

According to the first condition, the determination of the character configuration information has been completed by all players participating in this game within time to, at this moment, the character selection stage will be ended directly, the resource loading stage will be skipped, t0<t1.

According to the second condition, the determination of the character configuration information is not completed by all players participating in this game within predetermined time t1, or the determination of the character configuration information has just been completed when the predetermined time t1 is reached, the character selection stage will be ended automatically, the resource loading stage will be skipped when the time t1 is reached.

When the character selection stage is ended under the first condition, a prompt message that the character selection stage is about to end will be provided in the display interface of the character selection stage in a manner of a timer. For example, numbers 10, 9, 8, . . . , 1 are dynamically displayed in the interface sequentially, and then the display interface of the resource loading stage is entered.

It is to be understood that, for the case that character selection is not completed during the character selection stage under the second condition, corresponding character configuration information will be automatically determined for the player when the predetermined time t1 is reached, for example, automatically selecting a corresponding character, a skin of the character, and a skill of the character.

Further, in a case of performing the skipping the first and second conditions, the preloading of the static resource is stopped as long as the character selection stage is ended, then during the resource loading stage, the dynamic resource set of this game is started to be loaded, and the remaining partial static resources, that are not loaded, in the static resource set, are continued to be loaded during the character selection stage.

Through an embodiment provided by this application, the conversion from the character selection stage to the resource loading stage is realized by using two different conditions, and the two different conditions are applied to different scenarios, which can achieve the technical effect of improving the resource loading flexibility while improving the resource loading efficiency.

In a some resources loading methods, when the resource loading stage ends, the resources used during other stages of the game will be released. Usually, there is a duplicate part of resources required for the next round and the current round, and for this part of resources, if the resources that have been loaded in the current round are directly reused in the next round, the loading efficiency of the next round can be effectively improved.

Figure 12:
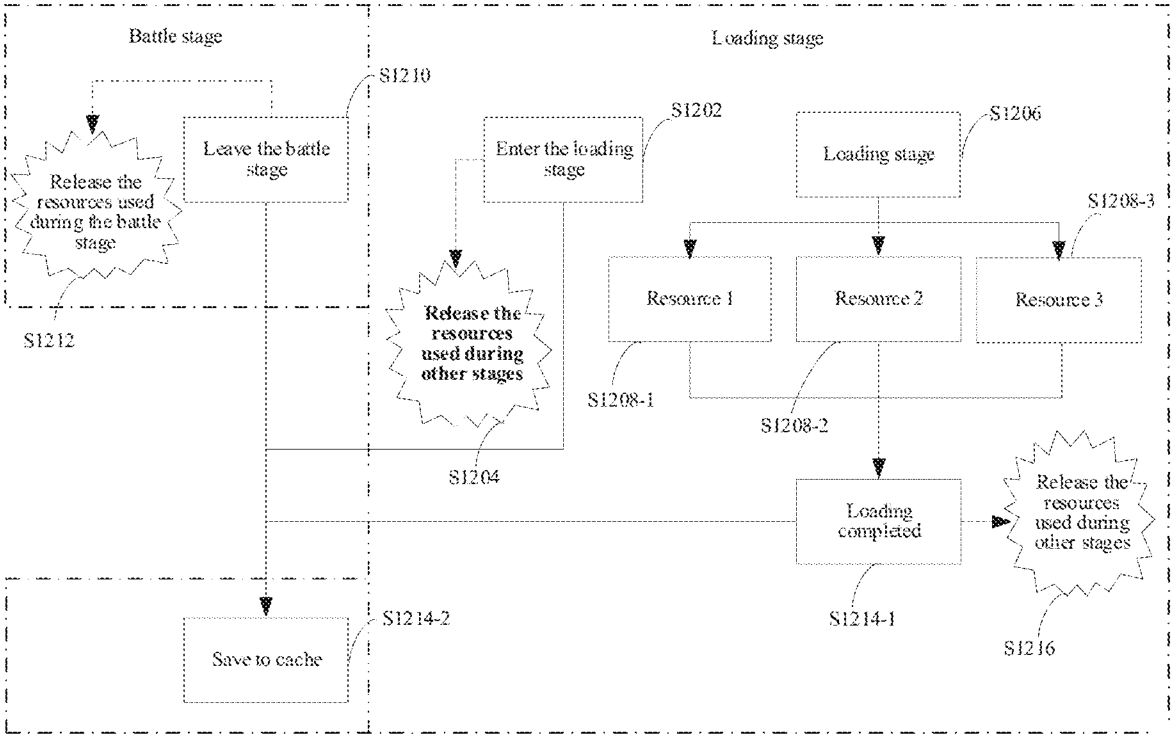
FIG. 12 is a schematic diagram of an optional release/save resource cache according to some embodiments.

In some embodiments, the resources that have been loaded in the current round may be reused in a manner of releasing a resource cache as shown in FIG. 12, specifically, including: storing the loaded static resource set in a target cache in the round; and loading partial or all static resources in the static resource set from the target cache during the character selection stage of a next round.

In this embodiment, the static resource set and the dynamic resource set required for the game during the character selection stage and the resource loading stage are loaded (as operations S1202, and S1206-1214-1), and the loaded static resource set is stored in the target cache after the loading of all resources is completed (as operation S1214-2).

In a resource loading process of the next round, the resources having a duplicate part with the current round are directly acquired from the target cache through a label set for an offline static resource during the editor stage, which reduces the quantity of the resources that may be loaded in the next round, and shortens the resource loading time of the next round.

The duplicate part of resources of the current round and the next round in this embodiment is not limited. In other words, the duplicate part of resources may be part resources or all static resources in the static resource set required for the current round.

Further, for the resources (for example, battle data) generated during a battle stage, the resources used during the battle stage are released by performing operation S1212 when leaving the battle stage (operation S1210), and then the battle data of the current round cannot be referenced in the next round. Therefore, in the embodiment of this application, the resources generated during the battle stage are stored in the target cache when leaving the battle stage through operations S1210 and Operation S1214-2. The battle data of the current round may be directly acquired from the target cache during the battle stage of the next round, which provides reference data for the battle stage of the next round, and helps improve the battle capability in the next round.

In some embodiments, the operation of loading partial or all static resources in the static resource set from the target cache during the character selection stage of a next round includes:

- all static resources in the static resource set are multiplexed from the target cache based on a game mode of the round being the same as the game mode of the next round; and/or
- partial static resources in the static resource set are multiplexed from the target cache based on the game mode of the round being different from the game mode of the next round, the partial static resources being the static resources to be used in the next round.

Figure 13:
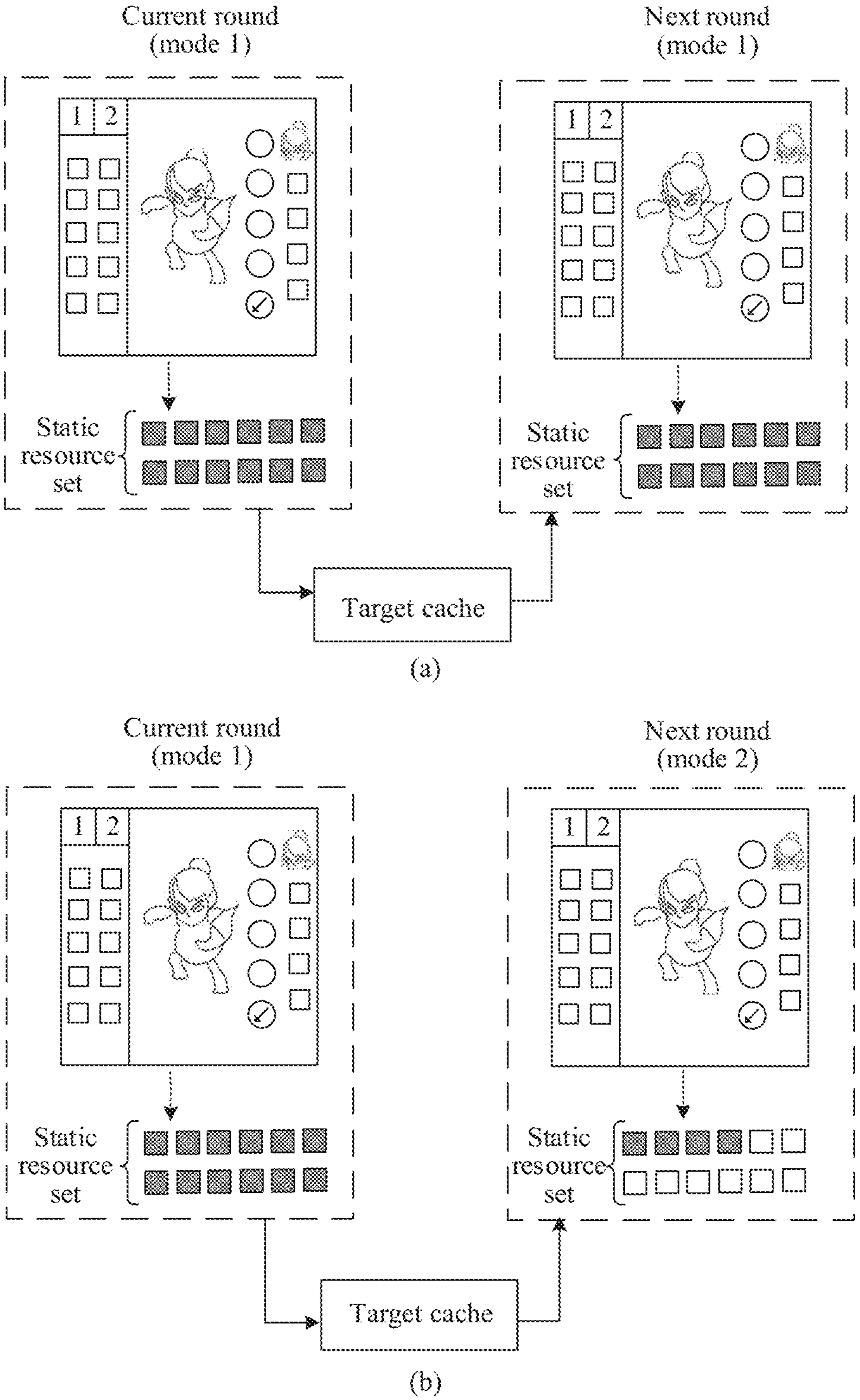
FIG. 13 is an optional schematic diagram of static resource preloading in different game modes according to some embodiments.

Specifically, on a premise of assuming that the game mode includes a mode 1 (qualifying) and a mode 2 (matching), as shown in (a) in FIG. 13, when the game modes of the current round and the next round are the same, and both are in a qualifying mode, all static resources that are pre-stored and have been loaded in the current round may be directly acquired from the target cache when the static resources of the next round are loaded.

As shown in (b) in FIG. 13, the mode of the current round is in the qualifying mode, and the mode of the next round is in the matching mode, there may be part same static resources in the static resources used in two rounds of game since the two game modes are different. When the static resources of the next round are loaded, the loaded static resources of the same part may be directly acquired from the target cache.

The resources that are related to the game mode of the round mainly include the resources corresponding to scenario elements and an NPC in the game, for example, the resources corresponding to grass, a lamp, a wall, and other virtual objects appearing on a game map, and the resources corresponding to different NPCs. That is, the resources that are related to the game mode are the static resources of a round. Therefore, when the game modes of the two rounds of game are the same, it means that the static resources required to be used in the two rounds of game are also the same. On the contrary, when the game modes of two rounds of game are different, the static resources required for the two rounds of game may be partially the same.

Through an embodiment provided by this application, a loaded static resource set is stored in the target cache in a round, and then all or partial static resources in the static resource set are directly acquired from the target cache according to the labels of the static resources when the static resources of the next round are loaded, which realizes the reuse of game resources, shortens the resource loading time for the next round, and improves the resource loading efficiency.

In some embodiments, the resource preloading method further includes:

after the resource loading stage ends, a game screen of a battle stage of the round is displayed according to the loaded static resource set and dynamic resource set.

In this embodiment, the loading of all resources of a round is completed through the character selection stage and the resource loading stage. The resources include static resources and dynamic resources. Then, images corresponding to various resources are rendered according to the loaded static resources and the loaded dynamic resources to form an image set. Finally, a game screen of the battle stage of the round is dynamically displayed according to the images in the image set.

Specifically, as shown in FIG. 3, the loading of the static resource set and the loading of the dynamic resource set are completed through the character selection stage and the resource loading stage. For example, the character 300, the skill 303 of the character 300, and other information shown in FIG. 3 all belong to the dynamic resources in the dynamic resource set, and scenario elements (grass) in FIG. 3 belongs to a static resource in the static resource set. A virtual button corresponding to the skill 303 may be displayed in the game screen of the battle stage by rendering the loaded resources of the skill 303. The character 300 may be displayed in the game screen of the battle stage by rendering the resources corresponding to the character 300.

Based on the same principle, in-round objects, for example, grass, a lamp, and an NPC on a game map, corresponding to all static resources in the game screen during the battle stage may be displayed by rendering the static resources in the static resource set according to the static resource set that has been loaded during the character selection stage and the resource loading stage.

Through an embodiment provided by this application, partial or all static resources of a round are preloaded during the character selection stage, which reduces the quantity of resources to be loaded during the resource loading stage and shortens the resource loading time, thereby improving the efficiency of rendering the loaded resources, reducing the frame rate lag caused by resource loading time in the round, improving an effect of displaying the game screen during the battle stage, and improving the user experience.

Figure 14:
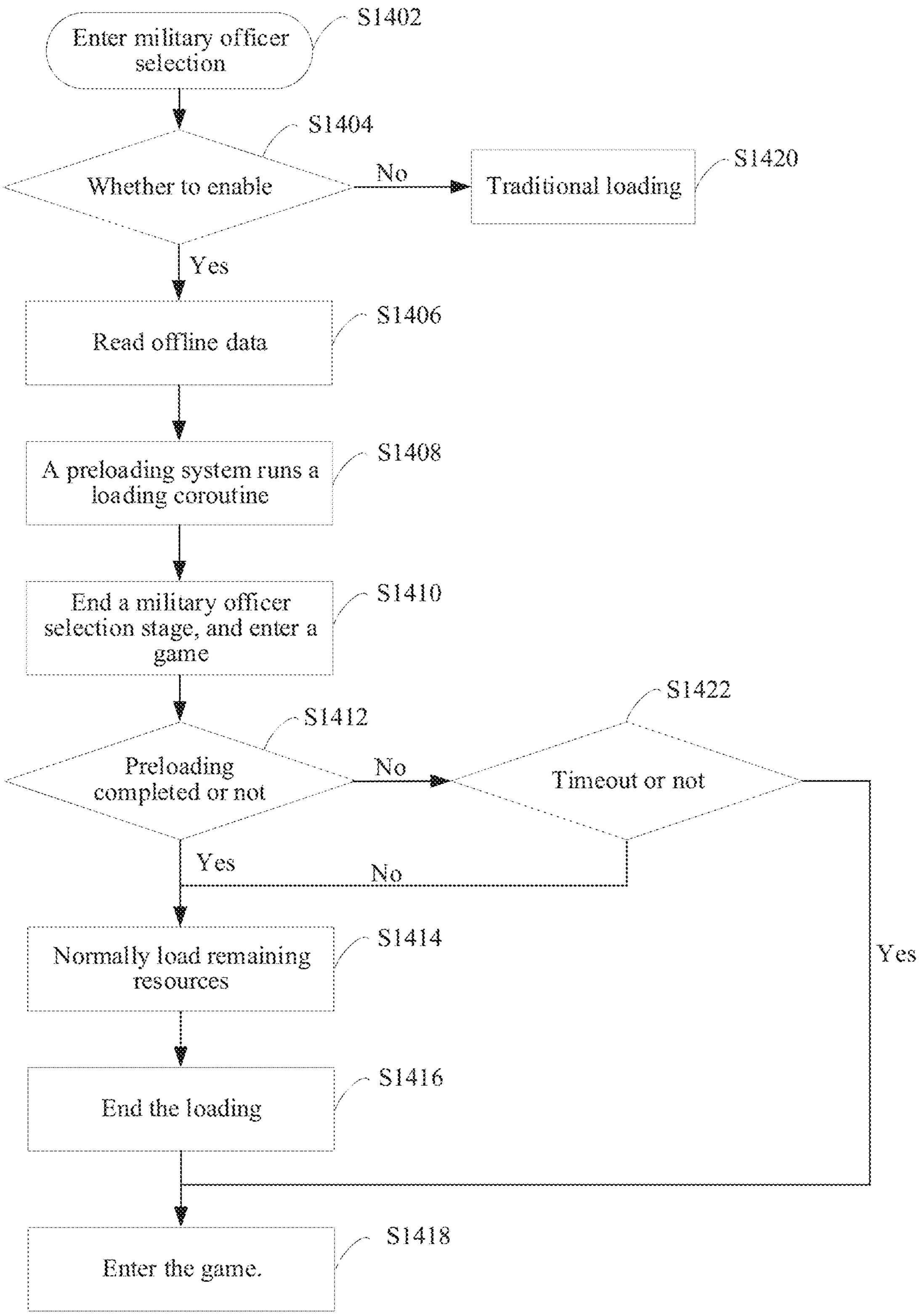
FIG. 14 is an overall flowchart of an optional resource preloading method according to some embodiments.

In order to better understand various implementation solutions, this application further provides an overall flowchart of a resource preloading method, specifically, as shown in FIG. 14, including the following operations:

S1402: Enter a character selection stage of a game, as the character selection stage shown in FIG. 3.

S1404: Determine whether to enable to preload offline static resources; perform operation S1406 based on it is determined to enable to preload the offline static resources; or perform operation S1420 based on it is determined to not enable to preload the offline static resources.

S1406: Read offline data.

S1408-S1410: a preloading runs a loading coroutine, and enters a resource loading stage of the round after the military officer selection stage ends, as shown in FIG. 11, the resource loading stage of skipping from t0 or t1 to t2.

S1412: Determine whether preloading is completed, perform S1414 based on the preloading being completed, normally load the remaining resources (including unloaded static resources and dynamic resources), and specifically, referring to the resource loading stage as shown in FIG. 5, load the dynamic resources and the static resources that are not loaded during the character selection stage;

perform operation S1422 based on the preloading being not completed, determine whether the preloading times out, and perform operation S1414 to normally load the remaining resources based on a result indicating that the preloading does not time out; or perform operation S1418 based on the result indicating that the preloading times out.

S1416: Perform operation S1418 after the loading of game resources is completed.

S1418: Enter the game.

S1420: Perform traditional loading.

Figure 15:
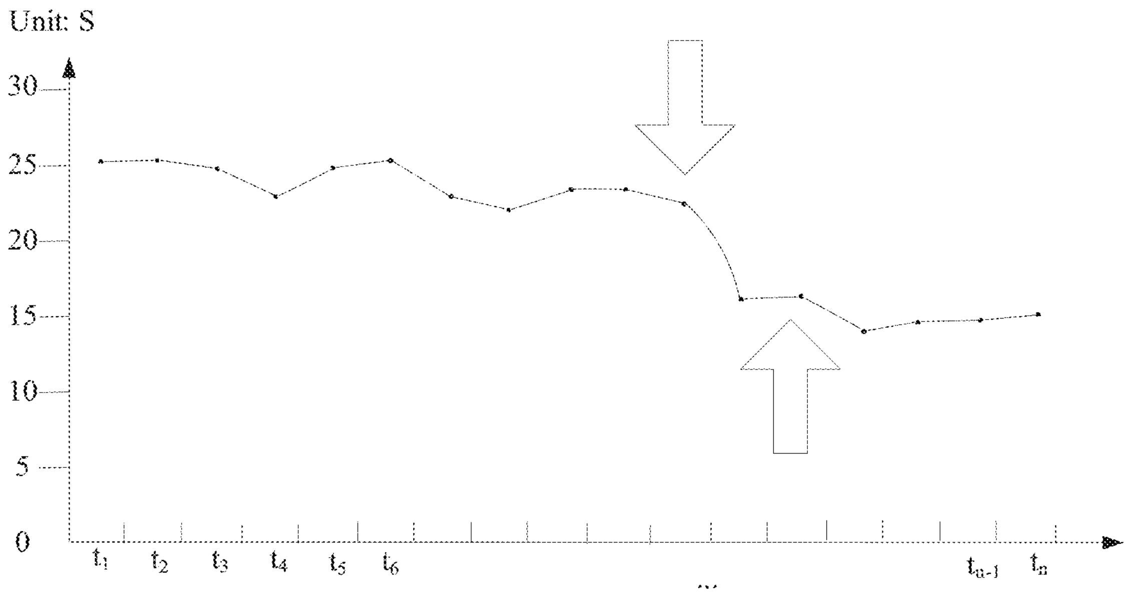
FIG. 15 is an optional effect diagram for testing by using the resource preloading method according to some embodiments.

The resource loading duration of a certain game is tested by the resource preloading method in the embodiment of this application to obtain an effect diagram as shown in FIG. 15. In FIG. 15, horizontal coordinates t1 to tn represent game testing time, and vertical coordinates represent the average resource loading duration of the same game at different testing time in an actual battle process, for example: the average resource loading duration per day.

From a curve graph of the resource loading duration in FIG. 15, it can be intuitively seen that by using the resource preloading method in the embodiment of this application, the resource loading duration of the same game will gradually decrease with the change of the testing time. That is, part or all static resources of a game are preloaded by using the idle time of the character selection stage (military officer selection stage), which shortens the resource loading time, improves the resource loading efficiency, and solves the technical problem of excessive resource loading time in a some resources loading methods.

To simplify the description, the foregoing method embodiments are described as a series of action combinations. But those skilled in the art are to be understood that this application is not limited by the described action sequence, because certain operations may be performed in other sequences or simultaneously in accordance with this application. Secondly, those skilled in the art also to be understood that the embodiments described in the specification are all preferred embodiments, and the actions and the modules involved are not necessarily required in some embodiments.

Figure 16:
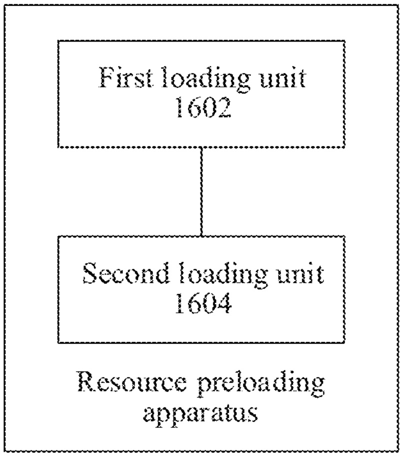
FIG. 16 is a schematic structural diagram of an optional resource preloading apparatus according to some embodiments.

Some embodiments provide, a resource preloading apparatus configured to implement the resource preloading method. As shown in FIG. 16, the apparatus includes:

a first processing unit 1602, configured to load a static resource set of a round during a character selection stage of the round, the character selection stage selecting a virtual character participating in the round, and the static resource set including resources that are to be used in the round and are not related to character configuration information determined during the character selection stage; and a second processing unit 1604, configured to load, based on the loading of the static resource set being completed during the character selection stage, a dynamic resource set of the round during a resource loading stage of the round, the dynamic resource set including resources that are to be used in the round and are related to the character configuration information determined during the character selection stage.

In some embodiments, the resource preloading apparatus further includes:

a third loading unit, configured to load, based on the loading of partial static resources in the static resource set being completed during the character selection stage, a dynamic resource set of a round, and load static resources, except partial static resources, in the static resource set during the resource loading stage of the round.

In some embodiments, the operation of loading the dynamic resource set of the round and loading static resources, except partial static resource, in the static resource set during the resource loading stage of the round includes:

the first loading module is configured to load the dynamic resource set of the round and the static resources, except the partial static resource, in the static resource set concurrently during the resource loading stage of the round.

In some embodiments, the resource preloading apparatus further includes:

a first display unit, configured to display first prompt information during the character selection stage based on the static resource set of the round being loaded during the character selection stage of the round, the first prompt information prompting that part resources of the round have been preloaded; or a second display unit, configured to display, based on the static resource set of the round being loaded during the character selection stage of the round, second prompt information during the resource loading stage, the second prompt information prompting that part resources of the round have been preloaded.

In some embodiments, the first prompt information displays a loading progress of the static resources, and the second prompt information displays a proportion of the static resources that have been preloaded to total resources.

In some embodiments, the first loading unit includes:

a first processing module, configured to load various static resource subsets in the static resource set sequentially or concurrently during the character selection stage, the various static resource subsets including at least one of the following:

a scenario resource subset in the round, the scenario resource subset including a resource of a virtual object appearing on a game map in the round; or an NPC resource subset in the round, the NPC resource subset including resources of one or more NPCs in the round.

In some embodiments, the first processing module includes:

a processing submodule, configured to repeat the following operations until the character selection stage ends or the loading of the various static resource subsets is completed:

storing the resource path information of the current static resource in the target resource list, based on a current static resource to be used in the round being determined and resource path information of the current static resource being not stored in a target resource list;

acquiring the resource path information of unloaded partial static resources sequentially or concurrently from the target resource list, and loading the partial static resources according to the resource path information of the partial static resources;

performing in-round object instantiating on the loaded partial static resources to obtain an instantiated object of the partial static resources; and storing the instantiated object of the partial static resources in an object buffer pool.

In some embodiments, the third loading unit includes:

a second processing module, configured to pause, based on the character selection stage ending in response to completing the loading of the partial static resources during the character selection stage, the loading of the static resource, start the loading of the dynamic resource set of the round at a beginning of the resource loading stage, and continue the loading of the static resources, except the partial static resources, in the static resource set.

In some embodiments, the resource preloading apparatus further includes:

a storage unit, configured to store the loaded static resource set in a target cache in the round; and a fourth loading unit, configured to multiplex part or all static resources in the static resource set from the target cache during the character selection stage of a next round.

In some embodiments, the fourth loading unit includes:

a second loading module, configured to multiplex all static resources in the static resource set from the target cache based on a game mode of the round being the same as the game mode of the next round; and/or a third loading module, configured to multiplex partial static resources in the static resource set from the target cache based on the game mode of the round being different from the game mode of the next round, the partial static resources being the static resources to be used in the next round.

In some embodiments, the resource preloading apparatus further includes:

a display unit, configured to display, after the resource loading stage ends, a game screen of a battle stage of the round according to the loaded static resource set and dynamic resource set.

The embodiments of the resource preloading apparatus here may refer to the embodiments of the resource preloading method, which will not be elaborated herein.

Figure 17:
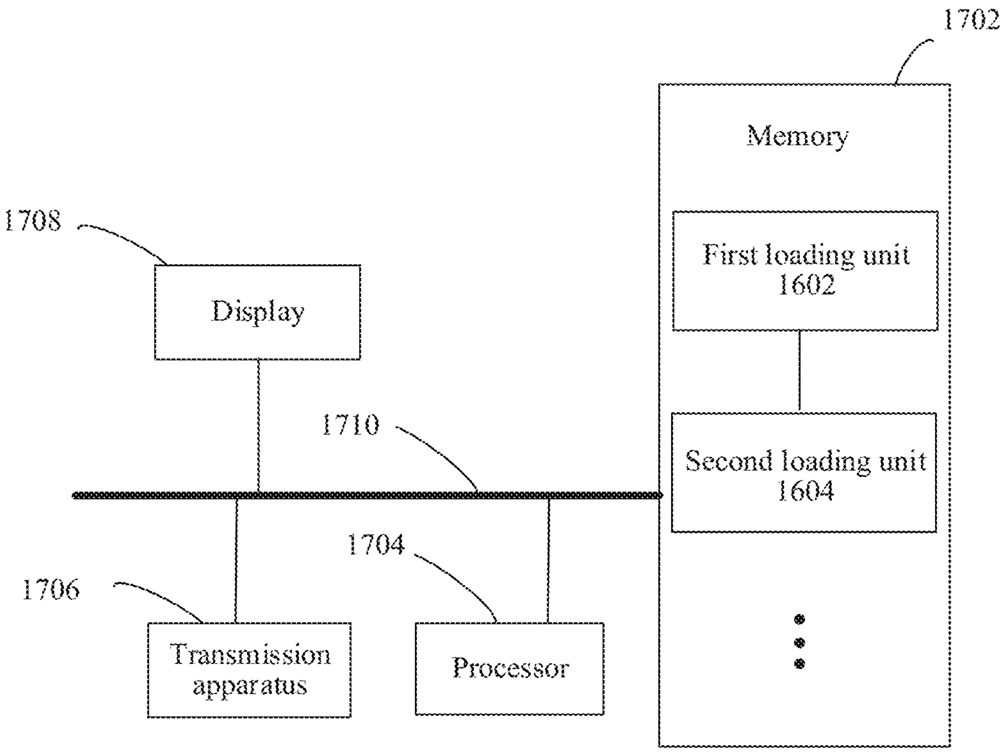
FIG. 17 is a schematic structural diagram of an optional computer device according to some embodiments.

Some embodiments provide a computer device for implementing the resource preloading method. The computer device may be a terminal device or a server shown in FIG. 17. This embodiment is described by taking the computer device being the server as an example. As shown in FIG. 17, the computer device includes a memory 1702 and a processor 1704. The memory 1702 stores a computer-readable instruction. The processor 1704 is configured to implement the operations in any of the method embodiments through the computer-readable instruction.

In some embodiments, in this embodiment, the computer device may be located in at least one of a plurality of network devices in a computer network.

In some embodiments, in this embodiment, the processor may be configured to perform the following operations through the computer-readable instruction:

S1: Load a static resource set of a round during a character selection stage of the round, the character selection stage selecting a virtual character participating in the round, and the static resource set including resources that are to be used in the round and are not related to character configuration information determined during the character selection stage.

S2: Load, based on the loading of the static resource set being completed during the character selection stage, a dynamic resource set of the round during a resource loading stage of the round, the dynamic resource set including resources that are to be used in the round and are related to the character configuration information determined during the character selection stage.

In some embodiments, those of ordinary skill in the art may understand that the structure shown in FIG. 17 is merely an example, and the computer device may also be a terminal device such as a smartphone (for example, an Android phone and an iOS phone), a tablet computer, a palmtop computer, a mobile Internet device (MID), and a PAD. FIG. 17 does not limit the structure of the computer device. For example, the computer device may also include more or fewer components (such as a network interface) than those shown in FIG. 17, or has a different configuration from that shown in FIG. 17.

The memory 1702 may be configured to store a software program and a module, for example, a program instruction/ module corresponding to a resource preloading method and apparatus in the embodiment of this application. The processor 1704 runs the software program and the module stored in the memory 1702, so as to perform various functional applications and data processing, that is, to implement the resource preloading method. The memory 1702 may include a high speed random access memory and may also include a non-volatile memory such as one or more magnetic storage apparatuses, flash memories, or other non-volatile solid state memories. In some embodiments, the memory 1702 may further include memories remotely disposed relative to the processor 1704, and these remote memories may be connected to a terminal through a network. Examples of the network include, but are not limited to, the Internet, an intranet, a local area network, a mobile communication network, and a combination thereof. The memory 1702 may specifically, but is not limited to, be configured for information, such as a static resource set and a dynamic resource set, required for a game. As an example, as shown in FIG. 17, the memory 1702 may include, but is not limited to, the first processing unit 1602 and the second processing unit 1604 in the resource preloading apparatus. In addition, the memory 1702 may include, but is not limited to, other module units in the resource preloading apparatus, which will not elaborated in this example.

In some embodiments, a transmission apparatus 1706 is configured to receive or transmit data through a network. Specific examples of the network may include a wired network and a wireless network. In one example, the transmission apparatus 1706 includes a network interface controller (NIC), which may be connected to other network devices and routers by using network cables, so as to communicate with the Internet or a local area network. In one example, the transmission apparatus 1706 is a radio frequency (RF) module, which is configured to communicate with the Internet in a wireless manner.

In addition, the computer device further includes: a display 1708, configured to display a game screen during a battle stage; and a connecting bus 1710, configured to connect various modules parts in the computer device.

In other embodiments, the terminal device or server may be a node in a distributed system. The distributed system may be a blockchain system. The blockchain system may be a distributed system formed by connecting a plurality of nodes in a network communication manner. A peer to peer (P2P) network may be formed between nodes. A computer device in any form, for example, a server and a terminal, may become a node in the blockchain system by joining the P2P network.

Some embodiments provide, a computer program product or a computer program. The computer program product or the computer program includes a computer instruction. The computer instruction is stored in a computer-readable storage medium. One or more processors of the computer device read the computer-readable instruction from the computer-readable storage medium. The one or more processors execute the computer-readable instruction, so that the computer device performs the resource preloading methods provided by some embodiments, and the computer device performs operations in any method embodiment.

In some embodiments, in this embodiment, the computer-readable storage medium may be configured to store a computer-readable instruction for performing the following operations:

S1: Load a static resource set of a round during a character selection stage of the round, the character selection stage selecting a virtual character participating in the round, and the static resource set including resources that are to be used in the round and are not related to character configuration information determined during the character selection stage.

S2: Load, based on the loading of the static resource set being completed during the character selection stage, a dynamic resource set of the round during a resource loading stage of the round, the dynamic resource set including resources that are to be used in the round and are related to the character configuration information determined during the character selection stage.

In some embodiments, in this embodiment, those of ordinary skill in the art will understand that all or part of the operations in various methods of the embodiments may be completed by a program to instruct related hardware. The program may be stored in a computer-readable storage medium. The computer-storage medium may include: a flash drive, a Read-Only Memory (ROM), a Random Access Memory (RAM), a magnetic disk, an optical disc, and other mediums.

Numbers in some embodiments are merely for description, but do not represent the superiority or inferiority of the embodiments.

When the integrated unit in the embodiments is implemented in a form of a software functional unit and sold or used as an independent product, the integrated unit may be stored in the computer-readable storage medium. Based on such an understanding, the technical solutions of this application essentially, or the part contributing to the some resources loading methods, or all or part of the technical solutions may be embodied in a form of a software product. The computer software product is stored in a storage medium and includes several instructions for instructing one or more computer devices (which may be personal computers, servers, network devices, or others) to perform all or part of the operations of the methods of some embodiments In some embodiments, the descriptions of various embodiments have respective focuses. For a part that is not described in detail in a certain embodiment, refer to related descriptions in other embodiments.

In several embodiments provided by this application, it is to be understood that, the disclosed client may be implemented in other manners. The apparatus embodiment described is only schematic, and for example, division of the units is only logic function division, and other division manners may be adopted during practical implementation. For example, a plurality of units or components may be combined or integrated into another system, or some characteristics may be neglected or not executed. In addition, the coupling, or direct coupling, or communication connection between the displayed or discussed components may be indirect coupling or communication connection by means of some interfaces, units, or modules, and may be in an electrical form or other forms.

The units described as separate parts may or may not be physically separate, and components displayed as units may or may not be physical units, that is, may be located in one position, or may be distributed on a plurality of network units. Part or all of the units may be selected according to actual needs to achieve the objectives of the solution of this embodiment.

In addition, various functional units in some embodiments may be integrated into one processing unit, or each unit may be physically separated, or two or more units may be integrated into one unit. The integrated unit may be implemented in the form of hardware, or may be implemented in a form of a software functional unit.

The descriptions are merely preferred embodiments of this application, and those of ordinary skill in the art may also make various improvements and refinements without departing from the spirit of this application. All these modifications and refinements are also to be considered as the scope of protection of this application.

What is claimed is:

1. A resource preloading method, the method being performed by at least one processor of an electronic device, the method comprising:

loading a static resource set of a round of a game during a character selection stage of the round, the character selection stage selecting a virtual character participating in the round, and the static resource set comprising resources that are to be used in the round and that are not related to character configuration information determined during the character selection stage;

based on the loading of the static resource set being completed during the character selection stage, loading a dynamic resource set of the round during a resource loading stage of the round, the dynamic resource set comprising resources that are to be used in the round and that are related to the character configuration information; and displaying, on a display of the electronic device, prompt information indicating that at least one of the static resource set and the dynamic resource set is loaded, wherein the loading of the static resource set comprises:

performing in-round object instantiating on at least one static resource included in the static resource set to obtain an instantiated object; and storing the instantiated object in an object buffer pool.

2. The method according to claim 1, further comprising:

based on the loading of the static resource set being partially completed during the character selection stage, loading a dynamic resource set of the round and loading remaining static resources in the static resource set during the resource loading stage of the round.

3. The method according to claim 2, wherein the dynamic resource set and the static resource set are loaded concurrently during the resource loading stage of the round.

4. The method according to claim 1, wherein based on the static resource set of the round being loaded during the character selection stage of the round, the method further comprises at least one of:

displaying first prompt information during the character selection stage, the first prompt information indicating that at least some resources of the round are preloaded; or displaying second prompt information during the resource loading stage, the second prompt information indicating that the at least some resources of the round are preloaded.

5. The method according to claim 4, wherein the first prompt information dynamically displays a loading progress of the static resources, and wherein the second prompt information displays a proportion of the static resources that have been preloaded to total resources.

6. The method according to claim 1, wherein the loading of the static resource set comprises:

loading a plurality of static resource subsets in the static resource set sequentially or concurrently during the character selection stage, and wherein the plurality of static resource subsets comprises at least one of:

a scenario resource subset in the round, the scenario resource subset comprising a resource of a virtual object appearing on a game map in the round; and a non-player character (NPC) resource subset in the round, the NPC resource subset comprising resources of one or more NPCs in the round.

7. The method according to claim 6, wherein, until the character selection stage ends or the loading of the plurality of static resource subsets is completed, the loading of the plurality of static resource subsets comprises:

based on a current static resource to be used in the round being determined and resource path information of the current static resource being not stored in a target resource list, storing the resource path information of the current static resource in the target resource list;

retrieving the resource path information of static resources which have not yet been loaded sequentially or concurrently from the target resource list, and loading the static resources according to the resource path information;

performing the in-round object instantiating on the loaded static resources to obtain at least one instantiated object of the partial static resources; and storing the at least one instantiated object of the partial static resources in the object buffer pool.

8. The method according to claim 2, wherein the loading of the dynamic resource set and the remaining static resources comprises:

based on the character selection stage ending while the loading of the static resource is not yet completed, starting the loading of the dynamic resource set at a beginning of the resource loading stage, and continuing the loading of the remaining static resources.

9. The method according to claim 1, further comprising:

storing the loaded static resource set in a target cache in the round; and loading at least one static resource in the static resource set from the target cache during the character selection stage of a next round of the game.

10. The method according to claim 9, wherein the loading of the at least one static resource comprises:

loading all static resources in the static resource set from the target cache based on a game mode of the round being same as a game mode of the next round; and loading a portion of the static resource set from the target cache based on the game mode of the round being different from the game mode of the next round, wherein the portion of the static resource set is to be used in the next round.

11. The method according to claim 1, further comprising:

displaying a game screen of a battle stage of the round based on the loaded static resource set and dynamic resource set, after the resource loading stage ends.

12. A resource preloading apparatus, comprising:

at least one memory configured to store program code; and at least one processor configured to read the program code and operate as instructed by the program code, the program code including:

first loading code configured to cause the at least one processor to load a static resource set of a round during a character selection stage of the round, the character selection stage selecting a virtual character participating in the round, and the static resource set comprising resources that are to be used in the round and are not related to character configuration information determined during the character selection stage;

second loading code configured to cause the at least one processor to, based on the loading of the static resource set being completed during the character selection stage, load a dynamic resource set of the round during a resource loading stage of the round, the dynamic resource set comprising resources that are to be used in the round and that are related to the character configuration information, and display, on a display of the resource preloading apparatus, prompt information indicating that at least one of the static resource set and the dynamic resource set has been loaded wherein the first loading code comprises:

instantiating code configured to cause the at least one processor to perform in-round object instantiating on at least one static resource included in the static resource set to obtain an instantiated object; and storing code configured to cause the at least one processor to store the instantiated object in an object buffer pool.

13. The resource preloading apparatus according to claim 12, wherein the program code further includes:

third loading code configured to cause the at least one processor to, based on the loading of the static resource set being partially completed during the character selection stage, load a dynamic resource set of the round and loading remaining static resources in the static resource set during the resource loading stage of the round.

14. The resource preloading apparatus according to claim 13, wherein the dynamic resource set and the static resource set are loaded concurrently during the resource loading stage of the round.

15. The resource preloading apparatus according to claim 12, wherein the program code further includes first displaying code configured to cause the at least one processor to, based on the static resource set of the round being loaded during the character selection stage of the round:

display first prompt information during the character selection stage, the first prompt information indicating that at least some resources of the round are preloaded; or display second prompt information during the resource loading stage, the second prompt information indicating that the at least some resources of the round are preloaded.

16. The resource preloading apparatus according to claim 15, wherein the first prompt information dynamically displays a loading progress of the static resources, and wherein the second prompt information displays a proportion of the static resources that have been preloaded to total resources.

17. The resource preloading apparatus according to claim 12, wherein the first loading code is further configured to cause the at least one processor to load a plurality of static resource subsets in the static resource set sequentially or concurrently during the character selection stage, and wherein the plurality of static resource subsets comprises at least one of:

a scenario resource subset in the round, the scenario resource subset comprising a resource of a virtual object appearing on a game map in the round; and a non-player character (NPC) resource subset in the round, the NPC resource subset comprising resources of one or more NPCs in the round.

18. The resource preloading apparatus according to claim 13, wherein the third loading code is further configured to cause the at least one processor to:

based on the character selection stage ending while the loading of the static resource is not yet completed, start the loading of the dynamic resource set at a beginning of the resource loading stage, and continue the loading of the remaining static resources.

19. The resource preloading apparatus according to claim 12, wherein the program code further includes:

storing code configured to cause the at least one processor to store the loaded static resource set in a target cache in the round; and fourth loading code configured to cause the at least one processor to load at least one static resource in the static resource set from the target cache during the character selection stage of a next round of the game.

20. A non-transitory computer-readable storage medium storing instructions, the instructions comprising: one or more instructions which, when executed by at least one processor of a resource preloading device, cause the at least one processor to:

load a static resource set of a round of a game during a character selection stage of the round, the character selection stage selecting a virtual character participating in the round, and the static resource set comprising resources that are to be used in the round and that are not related to character configuration information determined during the character selection stage;

based on the loading of the static resource set being completed during the character selection stage, load a dynamic resource set of the round during a resource loading stage of the round, the dynamic resource set comprising resources that are to be used in the round and that are related to the character configuration information; and display, on a display of the resource preloading device, prompt information indicating that at least one of the static resource set and the dynamic resource set has been loaded, wherein the to load the static resource set, the one or more instructions, when executed by the at least one processor, further cause the at least one processor to:

perform in-round object instantiating on at least one static resource included in the static resource set to obtain an instantiated object; and store the instantiated object in an object buffer pool.

* * * * *